(12) United States Patent
Braunstein

(10) Patent No.: US 9,295,140 B2
(45) Date of Patent: Mar. 22, 2016

(54) APPARATUS INTELLIGENT PARALLEL VIEW ILLUMINATION PIX-CELL, METHODS OF CONFIGURATION AND CONTROLS

(71) Applicant: Zachary Leonid Braunstein, San Marcos, CA (US)

(72) Inventor: Zachary Leonid Braunstein, San Marcos, CA (US)

( * ) Notice: Subject to any disclaimer, the term of this patent is extended or adjusted under 35 U.S.C. 154(b) by 0 days.

(21) Appl. No.: 14/590,981

(22) Filed: Jan. 6, 2015

(65) Prior Publication Data

US 2015/0201479 A1    Jul. 16, 2015

Related U.S. Application Data

(63) Continuation of application No. 61/926,939, filed on Jan. 13, 2014.

(51) Int. Cl.
*H05B 37/02* (2006.01)
*G09G 3/32* (2006.01)
*H05B 33/08* (2006.01)

(52) U.S. Cl.
CPC .............. *H05B 37/0227* (2013.01); *G09G 3/32* (2013.01); *H05B 33/0872* (2013.01); *H05B 37/0254* (2013.01); *H05B 37/0272* (2013.01)

(58) Field of Classification Search
CPC ........... H05B 37/0227; H05B 37/0272; H05B 37/0218; H05B 33/0854; H05B 33/0845; H05B 33/0869; H05B 33/0872; H05B 37/02; H05B 41/36; H05B 33/0848; H05B 33/0857; H05B 33/0896; H05B 39/088; H05B 41/38; G09G 3/32; G09G 3/3208; G09G 2320/0693; G09G 2340/0457; G09G 3/2085; G09G 3/2092; G09G 2300/0452; G09G 2300/0809; G09G 2300/0866; G09G 2320/0626; G09G 2330/021; G09G 2360/16; G09G 2380/06; G09G 3/3225; G09G 3/3233; G09G 3/3291; G09G 3/3406; G09G 3/3611; G09G 2320/0233; G09G 3/2003

See application file for complete search history.

(56) References Cited

U.S. PATENT DOCUMENTS

| | | | | |
|---|---|---|---|---|
| 7,907,133 | B2 * | 3/2011 | Joffer | G09G 3/2003 345/204 |
| 8,130,175 | B1 * | 3/2012 | Joffer | G09F 9/33 315/169.3 |
| 8,502,758 | B2 * | 8/2013 | Beland | G06F 3/1446 345/55 |

(Continued)

*Primary Examiner* — Vibol Tan

(57) ABSTRACT

Intelligent parallel view illumination pix-cell, and a system of pix-cells comprising configurable: illumination devices, controller, sensors, interfaces, mounting. Illumination configurations include: LED's, single color, multi-color, and generating light directed parallel to viewing surface. Sensor configurations include: ambient light, temperature. Interface configurations include: wireless, INTERNET. Mounting configurations include support for flexible illumination patterns with unique illumination parameters. Method of controls includes control algorithm and system acceptance criteria. Control algorithm configurations include: initial static and/or dynamic characterizations of pix-cell illumination properties as function of applied controls: real-time pix-cell/system controls based on established individual pix-cell static and/or dynamic properties, to achieve illumination effects within acceptance criteria. Configurations of acceptance criteria include: real-time creation and/or reproduction of video streams on super large scale screens/billboards; illumination of art and/or images on super large billboards; front/in-line/backlighting illumination of art; 3-D illumination effects. Controller monitoring sensors, executing real-time control algorithm sustaining operation of apparatus within acceptance criteria.

20 Claims, 20 Drawing Sheets

(56) References Cited

U.S. PATENT DOCUMENTS

| | | | | |
|---|---|---|---|---|
| 8,711,067 B2* | 4/2014 | Joffer | G09F 9/33 | 345/204 |
| 8,824,124 B1* | 9/2014 | Carlson | G06F 3/1446 | 361/622 |
| 9,058,755 B2* | 6/2015 | Cope | G02F 1/133305 | |
| 9,069,519 B1* | 6/2015 | Hall | G06F 3/1446 | |
| 9,081,552 B1* | 7/2015 | Hall | G06F 3/1446 | |
| 2003/0231151 A1* | 12/2003 | Barlow | G09F 9/33 | 345/82 |
| 2006/0227085 A1* | 10/2006 | Boldt | G09G 3/32 | 345/83 |
| 2007/0001942 A1* | 1/2007 | Johnson | G09G 3/02 | 345/81 |
| 2009/0128461 A1* | 5/2009 | Geldard | G06F 3/1446 | 345/84 |
| 2014/0333514 A1* | 11/2014 | Dupont Skovsby | G02B 6/08 | 345/82 |

* cited by examiner

Apparatus Intelligent Parallel View Illumination Pix-Cell, Methods of Configuration and Controls

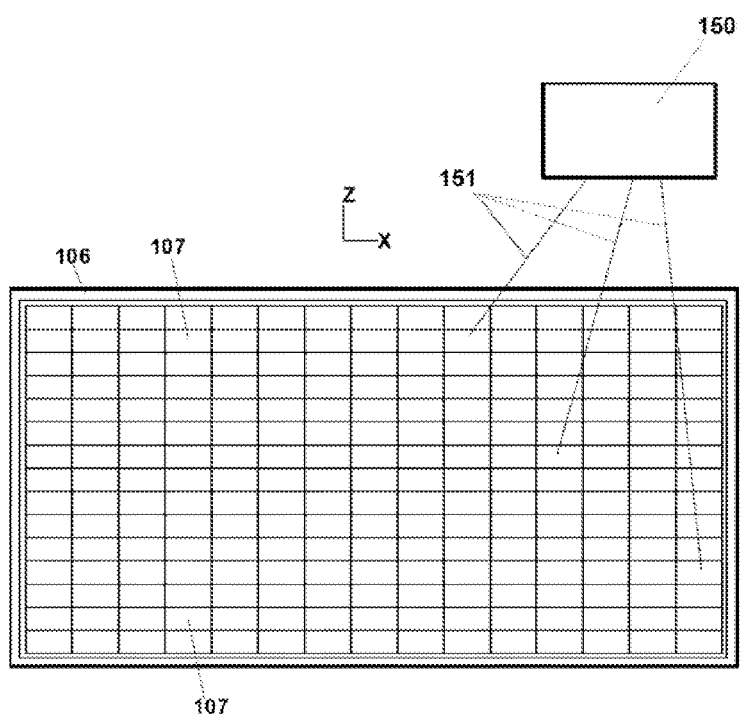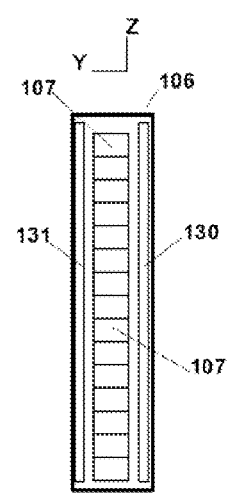
FIG. 30
FIG. 31

APPARATUS INTELLIGENT PARALLEL VIEW ILLUMINATION PIX-CELL, METHODS OF CONFIGURATION AND CONTROLS

CROSS-REFERENCE TO RELATED APPLICATIONS

I claim the benefits of Provisional Application No. 61/926,939 filed on Jan. 13, 2014, title "Apparatus Intelligent Parallel View Illumination Pix-Cell. Methods of Configuration and Controls".

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable

BACKGROUND OF THE INVENTION

The existing pixel (discrete light source) based technology includes: LED's constructed as a 3-color RGB combination of 3 discrete light producing diodes, and single color LED's. While discrete LED pixels are the building blocks for a variety of small and medium size displays, it is rather problematic to use LED pixels for creating super large scale displays. In addition, it is not as pleasant to view a large scale billboard from a close distance, in particular when each discrete LED pixel is shooting its light directly into the viewer eyes. A moderate increase in the size of a display—will cause a substantial increase of the number of LED pixels required. The greater number of LED pixels—impacts the costs (going up) as result of: an increase in number of components, and an increase in energy consumption. The increase in number of components lowers reliability. In addition, it is not as pleasant or even healthy to look directly at a display (billboard for an example) with a large number of pixels—all shining their light directly into the viewer eyes.

There are applications where an existing art can benefit from illumination of the art from either the back side of the art, front side, or both sides. In addition, an entire art or sections of the art need to be illuminated, with each section having independent controls in respect to the light parameters, such as: color; intensity; special dynamic effects such as blinking, rolling colors. The illumination of art can benefit from using multicolor illumination devices, such as RGB LED's. The controls can include variety of lighting parameters associated with a specific type of illumination device. There is a need to view art in a location where there is no electricity, and limited amounts of ambient light. This requires the controls and illumination devices operational from a backup power source, such as batteries, including solar batteries. There is an opportunity or potential for a new form of art, which can be created with initial understanding and use of illumination technology described in this application. Addition of illumination can enhance presentation of art by providing static and dynamic lighting effects.

There are large size billboards with a great number of LED's, with each LED generating the light directly toward the eyes of viewers. It is not healthy for a human eye to be exposed from a close distance to direct light generated by LED's, in particular such a huge number of LED's from a large billboard. These applications are based on dynamic real-time light controls to create dynamic images. These applications include Dynamic Billboards, which use RGB LED's as their control pixel. The RGB LED based pixels are controlled in real-time, directing their light toward the surface displaying the images. This method is not pleasant to a "naked eye" from a close distance, since the LED's are directing their bright lights straight toward the eye. In addition, the functionality of the RGB based Dynamic Billboards, is limited to functionality of its pixels, which are RGB LED's.

BRIEF SUMMARY OF THE INVENTION

The principal and methods described in this application in respect to parallel view pix-cell devices, solves the problem. The parallel view pix-cells will allow to provide soft illumination, including illumination of art, as well as to create opportunity to design billboards, including super large size billboards. The plug and power principals of interfacing the pix-cells will allow to simplify installation and maintenance. The parallel view pix-cells, configurable to create flexible illumination patterns, including backlighting, will provide desired illumination of existing art, enhancing its appearance. In addition, an entire art or sections of the art can be illuminated, with each section having independent configuration of illumination and controls, with configuration of illumination including: front illumination; backlighting; in-line illumination; and configuration of controls including the light parameters, such as: color; intensity; special dynamic effects such as blinking, rolling colors. For any given size of a display, the parallel view pix-cells, in contrast to discrete pixels, due to a lower number of LED pix-cells required, and consequently will significantly lower the number of LED's—will reduce the costs of the display and improve the reliability of the display.

In summary, the apparatus and the method of controlling the apparatus, will allow to create high quality super large dynamic images, which are pleasantly viewable even from a very close distances. In addition, utilization of Pix-Cells with a multi-row illumination strips stacked side-by-side along the inner perimeter of the Pix-Cell will allow to create unique 3-D effects, as the Pix-Cell will add visual depth as one of control parameters.

BRIEF DESCRIPTION

Drawing Content and Listing

My application contains drawings listed in Table 1, below.

TABLE 1

List of Drawings

| FIGS. | Description |
|---|---|
| 1 | 2D front view example of an existing discrete LED pixel layout |
| 2 | 2D side view example of an existing discrete LED pixel layout |
| 3 | 2D front view example #1 of the apparatus configured as intelligent configurable illumination Pix-Cell consisting of four LED's |
| 4 | 2D front view example #2 of the apparatus configured as intelligent configurable illumination Pix-Cell consisting of six LED's |
| 5 | 2D side view of the of the apparatus configured as intelligent configurable illumination Pix-Cell in the example #2 |
| 6 | 2D front view example #3 of the apparatus configured as intelligent configurable illumination Pix-Cell consisting of two LED's |

TABLE 1-continued

List of Drawings

| FIGS. | Description |
|---|---|
| 7 | 2D front view example #4 of the apparatus configured as intelligent configurable illumination Pix-Cell consisting of two LED's |
| 8 | 2D front view example #5 of the apparatus configured as intelligent configurable illumination Pix-Cell consisting of six LED's |
| 9 | 2D front view example #6 of the apparatus configured as intelligent configurable illumination Pix-Cell consisting of six LED's |
| 10 | 2D front view example #7 of a illumination layout using the apparatus configured as intelligent configurable illumination Pix-Cells shown on FIG. 3 |
| 11 | 2D front view example #8 of a illumination layout using the apparatus configured as intelligent configurable illumination Pix-Cells shown on FIG. 6 |
| 12 | 2D front view example #9 of the apparatus configured as intelligent configurable illumination Pix-Cell consisting of three LED's |
| 13 | 2D front view example #10 of a illumination layout using the apparatus configured as intelligent configurable illumination Pix-Cells shown on FIG. 12 |
| 14 | 2D front view example #11 of a illumination layout using the apparatus configured as intelligent configurable illumination Pix-Cells shown on FIG. 12 |
| 15 | 2D front view example #12 of a illumination layout using the apparatus configured as intelligent configurable illumination Pix-Cells shown on FIG. 12 |
| 16 | 2D front view example #13 of a illumination layout using the apparatus configured as intelligent configurable illumination Pix-Cells shown on FIG. 12 |
| 17 | 2D front view example #14 of the apparatus configured as intelligent configurable illumination Pix-Cell consisting of one LED's |
| 18 | 2D front view example #13 of a illumination layout using the apparatus configured as intelligent configurable illumination Pix-Cells shown on FIG. 17 |
| 19 | Block-diagram illustrating characterization of a Pix-Cell by a Controller, which can be also used for closed-loop control of the Pix-Cell |
| 20 | Block-diagram illustrating characterization of a Module of Pix-Cells by a Controller, which can be also used for closed-loop control of the Module of Pix-Cells- |
| 21 | Block-diagram illustrating open-loop control of a Pix-Cell by a Controller |
| 22 | Block-diagram illustrating open-loop control of a Module of Pix-Cells by a Controller |
| 23 | Block-diagram illustrating open-loop control of a Pix-Cell by a Controller based on image produced by an independent device |
| 24 | Block-diagram illustrating closed-loop control of a Module by a Controller based on image produced by an independent device |
| 25 | System diagram-layout example #14 duplicating an image to a larger format using apparatus configured as intelligent configurable illumination Pix-Cells |
| 26 | Control detail for the system diagram shown on FIG. 25 |
| 27 | System diagram-layout example #15 duplicating an image to a larger format using groups of apparatus configured as intelligent configurable illumination Pix-Cells |
| 28 | System diagram-layout example #16 duplicating live video on a larger format using groups of apparatus configured as intelligent configurable illumination Pix-Cells |
| 29 | System diagram-layout detail shown on FIG. 28 |
| 30 | System diagram-layout example #17 duplicating live video on a larger format using groups of apparatus configured as intelligent configurable illumination Pix-Cells |
| 31 | System diagram-layout detail shown on FIG. 30 |
| 32 | 3D view example #18 of a section of the apparatus configured as intelligent configurable illumination flexible strip with flexible support channel bottom side only, shown five LED's |
| 33 | 2D top view example #19 of a section of the apparatus configured as intelligent configurable illumination flexible strip, shown eleven LED's |
| 34 | 2D top view example #20 of a section of the apparatus configured as intelligent configurable illumination flexible strip with light partitions, shown eleven LED's |
| 35 | 3D view example #21 of a section of the apparatus configured as intelligent configurable illumination flexible strip with flexible support channel top/bottom sides, shown five LED's |
| 36 | 2D view example of an art, which is sectionalized for illumination by the apparatus |
| 37 | 2D view example of the art (FIG. 36), with sections illuminated by the apparatus |
| 38 | 2D view example of a surface with a section illuminated by the apparatus containing pix-cell located in-front of the section providing front illumination of the section |
| 39 | 2D view example of a surface with a section illuminated by the apparatus containing pix-cell located behind the section providing backlighting illumination of the section |
| 40 | 2D view example of a surface positioned inside the apparatus, with the entire surface within the pix-cell of the apparatus, with the pix-cell providing in-line illumination |
| 41 | 2D view example of a surface being illuminated by a combination of: two Pix-cells placed in-front and one Pix-cell placed behind |
| 42 | 2D view example of a surface being illuminated by a combination of: two Pix-cells placed in-front; one Pix-cell placed behind; and three Pix-cells placed along selected sections on the top, right side, and bottom of the surface |
| 43 | Example of flexible PCB containing pix-cells aligned in a dual row in-line configuration |
| 44 | Example of flexible PCB containing pix-cells aligned in a dual row off-set configuration |

DRAWING CONVENTION AND FORMAT

Drawings with this application, in addition to USPTO requirements, are:
a) Not to scale.
b) Dashed lines are used for outlining a group of parts, sub-assemblies and assemblies, which can be identified by unique number as a sub-assembly or as an assembly

DEFINITIONS

My application contains definitions of specific components or processes, which are listed below. Definitions are used and expanded in greater details in later paragraphs.

Battery

Defined as a battery which can be configured as a conventional battery pack, or solar battery, or another power storage device within required power specifications.

Controller Board

Defined as a PC board, including flexible, which can house such components, as: electronic Control devices—embedded controllers and support electronics; Light Sources, such as LED's; communication electronics for wired and/or wireless communications with a remote host computer, other Modules; sensors which can detect change in exterior lighting, and which can be used by Controller to optimize required illumination intensity; sensors which can detect ambient temperature, and which can be used by Controller to optimize amount of drive power of illumination components; sensors which can detect motion of an object, and which can be used by Controller for optional add-on security feature—to either acknowledge the event, or sound an alarm of an intruder; driver electronics which can be used to power electronics and other devices; sensor, which can be used for remote control; interface connectors. The Controller Board can be configured, including parameters such as its: size, thickness, shape to meet requirements of a specific application. Controller Board can be configured to support Light Sources for Perimeter Lighting of round and/or rectangular shaped Status Light Controller Board can be configured, so that both sides of it can be populated with required components. Controller Board can be configured to support Perimeter Adapters, and other components. Controller Board can be powered by various methods, which can include power sources with respective DC power specifications (voltage, current, ripple, temperature range): AC-DC power converters; solar energy collection technology based DC power source; batteries. Controller Board can be configured to interface to remote devices, such as: remote Controller via LAN; other devices, such as activation relays via direct wiring interfaces; with an objective to provide required level of control for a specific application. Controller Board can be configured to support Perimeter Adapters, and other components. Controller Board can be configured to provide required functions for an Identification Device.

Communication Interface

Defined as serial communications between Light Controller and variety of devices, such as: remote computer, remote Controller, remote Module, Communication Interface can be implemented based on standard communication platforms, such as: RS232, USB, wireless technologies, such as cellular. Communication Interface can be configured to support multi-drop LAN, which can allow connection of several Light Controllers via LAN to remote computer, or Controller.

Control

Defined as electronic component or embedded control device within the apparatus configured to monitor status of Sensors, and based on embedded algorithm execute controls in real-time to attain criteria stored in its memory, and can interface to remote HOST via wired or wireless interfaces, including INTERNET. Controller can be configured to include interface for local operator, and support operator ability to preset control functions. Controller can be configured to include self-diagnostics and report its status to remote HOST and local operator.

Control Function

Defined as a function, which can be executed by a local Controller of an Identification Device upon: direct request by an user via wireless remote control device; condition when a specific Trigger Point of a Sensor has been reached; request by a remote Controller over LAN. Control Function can include: tuning ON/OFF devices, such as: Illumination Devices, audio, Illumination Defined, as a method of positioning illumination devices, such as solid state, in respect to the surface intended for illumination. Illumination configurations include: front illumination when illumination devices are placed in-front of the illuminated surface; back illumination, or backlighting, when illumination devices are placed behind of the illuminated surface; in-line illumination when illumination devices are placed along the edges of the illuminated surface, or the illuminated surface is positioned in-between illumination devices. The illuminated surface can be art Configuration of the illuminated surface, including: dimensions, layout, materials—are selected to support selected method of illumination. For backlighting the illuminated surface is created from materials which will allow a light placed behind to be seen through.

Illumination Control

Defined as a Light Control, as it reflects on Illumination Parameters of a specific area or a surface. All available Light Control features, such as: intensity, color, special effects can be used by Controller to achieve desired Lighting effects for any given application.

Illumination Parameters

Defined as a variety of Light Control parameters, which can be applied toward illumination of a designated area or surface, which can be selected by Controller. Illumination Parameters include: illumination ON/OFF control; illumination intensity; illumination color; illumination cycling ON/OFF at selected frequency with respective selection of ON-cycle and OFF-cycle; illumination sequence; Selection of Illumination Parameters and their control for each given application, can be based on the type of illumination devices chosen to ensure their performance within specification parameters.

Illumination Device

Defined as a solid-state device which can be used by Controller alone, or in combination with other Illumination Devices to illuminate Designated Area(s). Illumination Device(s) can be used to provide; illumination of Symbol(s), Perimeter Lighting, Illumination Devices can be: of different colors, in standard or custom packaging per specific application. Include LED's.

Illumination Surface

Defined as a surface which can be configured with having art, including Symbol(s), located on either side of the Surface. The Illumination Surface can be illuminated by Illumination Device(s). The Illumination Surface can be configured to be placed either:

a) In front of Illumination Device(s), creating backlighting illumination b) In-between Illumination Device(s), creating in-line illumination c) Behind Illumination Device(s), creating front illumination Light Control Defined as electronic Control of Light Parameters of an individual solid-state Light Source, or a group of solid-state Light Sources. Due to superior characteristics of solid-state Light Sources, the Controller can execute an extensive range of Light effects for a specific application. The Lighting effects can be one or combination of any of the following Controls applied to individual solid-state Light Source or a designated group of Light Sources:

a) Cycling ON/OFF with stable or variable—ON-time, OFF-time, cycling frequency b) Dynamically changing drive power, which can be accomplished by changing either voltage, or current, or both, which can increase illumination intensity c) Applying Controls listed in (a) dynamically to a group of Lights in one direction, or changing directions d) Dynamically changing selected group of Lights in terms of their location and number of Lights within a group Light Controller Defined as a number of electronic components, which can include embedded Controllers, which can reside on the same PC board as the Light Sources, such as LED's, and which can execute required Control functions requested by operator or remote host computer. Light Controller, which can be based on standard embedded micro-Controller, or an ASIC, can be employed together with required peripheral support components, to execute a variety of Controls, which can take advantage of a wide-range of characteristic features of solid-state Light Sources.

The embedded micro-Controller can have a built-in temperature sensor, which can be used by Controller embedded software for monitoring ambient temperature surrounding micro-Controller. Since operating temperature of micro-Controller can be significantly higher than the required or selected maximum operating temperature of Light Sources within the Identification Light assembly, the micro-Controller temperature data can be used by Light Controller to ensure safe operation and Control of respective Light Sources. For each specific application, a limit of maximum operating temperature inside Identification Light assembly can be selected. In the event, the micro-Controller temperature reached that maximum limit, Controller software can execute one or combination of the following:

a) Turn OFF al Light Sources
b) Turn OFF selected Light Sources
c) Lower applied drive power to Light Sources
d) Execute a "warning-type" state, which can be pre-defined, and can include a specific Light effect,
e) Inform operator or computer via serial communication message of the fact the temperature reaching the set limit Light Controller is configurable to support required Communication Interfaces, with such features as:

a) Remote configuration of available Light Control features, including selection of specific Light effects to represent a specific state of Point-of-service location
b) Remote configuration of available Light Control features, including selection of specific Light effects to represent a specific "warning" state of Light Identification assembly, which can include: temperature limit; failure of one of parameters monitored by self-diagnostics of Controller software
c) Periodic or on-request reporting of Light Controller state and/or Status, which can include: current temperature data; state of selected group of Light Sources, Light Diffuser Defined as an optical component which when placed in-front of discrete Illumination Devices can blend their combined illumination, and can reduce or eliminate appearance of bright spots on the surface being illuminated by these Illumination Devices.

Light Parameters

Defined as a variety of Control parameters applied toward solid-state Light Sources, and which can be selected by Controller. Light Parameters can include: Light ON, Light OFF, Light intensity, Light color, Light cycling ON/OFF at selected frequency with respective selection of ON-cycle and OFF-cycle.

Light Retainer

Defined as an optical component which can be placed in-front of Illumination Devices, and which can serve to direct and/or retain as much illumination toward a designated area, as possible.

Parallel Lighting

Defined as a method of generating light by the Light Sources in a direction substantially parallel to the illuminated area or surface.

Pix-Cell

Defined as an independent illumination component configured for providing parallel view illumination functions within a system of Pix-Cells. In comparison to existing pixel oriented displays, the Pix-Cell from a system point of view, is considered as a display pixel, with the exception of the functionality and variety of configurations available for the Pix-Cell are significantly greater vs. existing pixel. Existing pixels, such as RGB LED's, have few controlled parameters: color and intensity. The Pix-Cells, in addition to color and intensity, have other configurable parameters as described below. In respect to Pix-Cell, a system of Pix-Cells can be designed using the same type of Pix-Cells, or any combination of various Pix-Cells, starting with each Pix-Cell being unique, or grouped Pix-Cells with the same properties. One of the most significant advantages of the Pix-Cells over existing Pixels, include: configurable physical layout of the Pix-Cells. Non intelligent Pix-Cell, as a component, consists of: enclosure, illumination devices, mounting components for illumination devices, control interface. The configuration parameters for the Pix-Cell enclosure include: shape; construction, such as number of sides installed, and with weather-proof rating or not; material properties of the inner sides of the enclosure to control illumination parameters, such as: light retention, light diffusion, light reflection; mechanical interface to other Pix-Cell enclosures to be attached to selected sides of the enclosure. The configuration parameters for the Pix-Cell Illumination devices, include: number and type of LED's, including single color, or RGB; mounting method, such as regular PCB, flex PCB or in-harness mount; location within the enclosure of the Pix-Cell; electronics to control light intensity generated by LED's, such as current limiting resistors. The configuration parameters for the Pix-Cell control interface, include: hardwired connectors, which can be daisy-chained between adjacent Pix-Cells. The intelligent Pix-Cell will in addition include: sensors, controller, and controller interface. The configuration parameters for the intelligent Pix-Cell sensors, include: type of sensor, such as temperature, current; sensor trigger points, including the ones related to self-diagnostics, which are stored in the non-volatile memory. The configuration parameters for the intelligent Pix-Cell controller, include: electronics to control illumination parameters of the LED's within the Pix-Cell, control algorithm defining Pix-Cell functionality, stored in the non-volatile memory. The configuration parameters for the intelligent Pix-Cell controller interface, include: electronics for daisy-chaining controls with adjacent Pix-Cells, wireless interface, including INTERNET, to a local or remote host controller.

Sensor

Defined as a Sensor which can detect any number of environmental or ambient conditions. These can include motion, light, sound, light through a camera (visible/infrared). Each Sensor can have sensor-specific Trigger Points or set levels, which can be set or programmed by an user, and which can be stored in a non-volatile memory of Controller. Controller in real-time can monitor Sensors, and detect condition when a respective Trigger Point has been reached. Controller can execute a Control Function, as programmed or set by an user, when a specific Trigger Point or combination of Trigger Points has been detected. Sensor can be also defined as a component or device within the apparatus configured to sense a specific parameter including: power parameters (voltage, current), ambient parameters (temperature, humidity, motion). Sensor can be configured for interfacing to control electronics.

Solar Battery

Defined as an industry standard or available Solar Battery technology, which can be incorporated into identification Devices, and can serve as a main power source, or in combination with other power sources—to provide electrical power to the identification device. This can significantly improve energy efficiency of Identification Devices, in particular the ones that are installed outdoors, with a sufficient exposure to ambient light sources, such as sun.

Trigger Points

Defined as an user set or pre-programmed level or value associated with a specific Sensor, which can be detected by Controller. Trigger Points can be stored in a non-volatile memory of Controller. Controller in real-time can monitor Sensors, and detect condition when a respective Trigger Point has been reached. Controller can execute a Control Function, as programmed or set by an user, when a specific Trigger Point or combination of Trigger Points has been detected.

Drawings

The application describes a configurable apparatus consisting of: illumination devices; sensors; and controllers. The configuration of illumination devices includes LED's. Configuration of LED's includes mounting of LED's on a PCB, and interfacing to a local controller. The configuration of PCB with illumination devices includes flexible circuit or flexible PCB, which can be further configured to create flexible illumination patterns or tracks. The flexible PCB can be supported by flexible channel. The flexible channel can be configured to provide support of the flexible PCB patterns or tracks, and can be further configured for mounting to a surface, including flat surfaces. The flexible channel can be configured to control light parameters such as: light retention, light reflection; light diffusion; light direction. Construction of the flexible channel can include L-shape and U-shape mechanical configuration. The L-shape consists of: bottom and side walls. The U-shape consists of: bottom; side; and top walls. The channel can be mounted to a surface from either sides or walls. The flexible PCB with illumination devices can be mounted to either side of the channel. The flexible PCB with illumination devices can be mounted such that the illumination devices direct their light: outward from the channel; inward toward a section of the channel; or combination of both. The channel, or a specific side of the channel, or a specific section of the channel can be made from materials affecting the light parameters: light retention, light reflection; light diffusion; light direction. The flexible PCB illumination devices can be mounted to: control or interface PCB; flat surfaces; surfaces with contouring sections. The attachment method of the flexible PCB to the flexible mounting channel includes use of adhesives. The attachment method of the flexible channels to a surface includes use of adhesives. The apparatus can include a number of individual flexible PCB's. Local controller can be installed on the same PCB with illumination devices, or on a separated PCB. The configuration of illumination devices includes controls initiated by a local controller. Configuration of local controller includes controls via wired or wireless interface such as INTERNET. The configuration of controls of illumination devices includes light parameters: intensity; color; blinking; light rolling.

The illumination patterns can be configured to illuminate a section of an existing art. The local controller configured to store: preset commands; operator control sequences; and controls in a non-volatile memory. Remote controller can execute in real-time a control algorithm of the local controller affecting light illumination parameters. The method of controls of the apparatus includes system acceptance criteria. Apparatus configured as closed-loop control system maintaining optimum use of illumination devices, supporting their operation from a backup power sources, including batteries. Controls can be applied to individual illumination device or to a group of illumination devices. Sensors include devices monitoring: ambient light; proximity; temperature; power applied to the apparatus. Each sensor can have preset limits, which are stored in non-volatile memory of the controller. Control algorithm can include specific controls when a preset limit is reached. Control algorithm record step-by-step control sequences executed by an operator, and then repeat the controls. Apparatus configured as closed-loop control system monitoring sensors, and maintaining optimum use of devices within apparatus, including illumination devices. Controller can control individual illumination device or groups of illumination devices. Illumination devices can consist of illumination devices of different properties or types, with controller providing controls within product specifications for each type of illumination device. The location of illumination devices and the control components affecting the direction of the light are configured to provide Illumination generated by illumination devices in a direction parallel to viewer eyes.

The apparatus can be configured with a single illumination pattern, or with combination of illumination patterns. The apparatus can be configured with controls of individual illumination device, such as LED. The apparatus can be configured with controls of groups of illumination device, such as LED's. The apparatus can be configured with controls of individual illumination devices, such as LED, and further configured with controls of groups of illumination device, such as LED's. The apparatus can be configured for illumination, including backlighting, of an existing art. The apparatus can be configured for illumination, including backlighting, as a process for creating new art, including large scale creation of art on a billboard. The apparatus can be configured for supporting re-creation of art from a small scale image to a large scale image, including billboard. The apparatus can be configured for supporting creation of an art from electronically recorded images to large scale images, including billboard. The apparatus can be configured with illumination devices directing their light primarily in a direction parallel to the viewer eyes.

The configurable apparatus has the following key features:
1) The configurations of the source of light include solid-state light producing devices.
2) Solid-state light producing devices are defined as solid-state components which convert energy from an applied power source to generate light. Example: LED.
3) The configurations of the power source for solid-state light producing devices include electrical power, such as voltage source, and/or current source.
4) The configurations of the solid-state devices include: single color LED's, and multi-color LED's such as RGB type.
5) The configurations of the solid-state devices include positioning of the devices in a direction to shine their light substantially in-parallel to the surface they intend to illuminate, i.e. parallel to the eyes of an observer.
6) The configurations of the solid-state devices include a number or devices grouped to create a Pix-Cell.
7) The configurations of the shape and size of the Pix-Cell include configurations designed to achieve the objective of a given application, and includes: triangular shapes, rectangular shapes, round shape, other shapes as needed.
8) The configurations of the solid-state devices, such as LED's, include aligning the devices along the inner perimeter of the Pix-Cell shining their light in a direction parallel to the illuminated surface seen by an observer.
9) The configurations of the solid-state devices include configuration of a single row of solid-state light producing devices wrapped around the inner perimeter of the Pix-Cell, and a multi-row of solid-state light producing devices aligned side-by-side and installed along the inner perimeter of the Pix-Cell. An individual row of solid-state light producing devices is referenced as a string of light.
10) The configurations of the Pix-Cell include pix-cell with an entire inner perimeter or section of the inner perimeter of the pix-cell populated with solid-state light producing devices (strings of light), as described above.
11) A single string of light can consist of one type or combination of several types of solid-state light producing devices. Example: single color LED's can be grouped into a string with RGB type of LED's, and sequence of arranging the string can include alternating between single LED and RGB LED.
12) The configurations of the control algorithm of the Pix-Cell include real-time control, which is defined as application in real-time of specified energy to solid-state light producing devices individually, and/or in groups, such as strings, with an objective to achieve the acceptance criteria.
13) The configurations of the pix-cell include configuration consisting of a combination of Pix-Cells to create a large scale dynamic displays.
14) Configurations of a dynamic display can incorporate designs in terms of display parameters, including: shape; size; illumination properties; controls; using Pix-Cells with the same specifications; or combination of Pix-cells with a variety of specifications.
15) The control algorithm of a dynamic display can be configured as the same for al pix-cells, or vary for each individual Pix-Cell to achieve required illumination effects.
16) The configuration of the Pix-Cells for dynamic display will depend on the specifications of the dynamic display, including: power requirements, illumination requirements, overall size, range of dynamic visual effects, resolution or granularity from a specified distance.
17) Individual designs of Pix-Cells can be characterized by applying a known control algorithm to the Pix-Cell and then analyzing via independent image analyzer the image properties produced by the Pix-Cell. Based on results of the analysis, a control table of the Pix-Cell can be created, which would list the command or controls applied and visual affects attained. The characterization can be performed for specific range of ambient environment.
18) The methods described in the application include real-time control of individual and/or groups of Pix-Cells to achieve the acceptance criteria, which include creating desired real time dynamic displays of large and super large dimensions, and controls including video data streams similar to the formats of the digital video and digital television.
19) The methods described in this application also includes digital image copying, which is defined as follows: a control image, considered as a target image, is reproduced on a small scale such as existing TV set, and then electronically copied to a large dynamic display consisting of Pix-Cells. This target image is then recorded in real-time and analyzed by an independent image analyzer using one of the image inputs on the analyzer. Controls are applied to a dynamic display consisting of Pix-Cells and the image produced by the dynamic display is then also analyzed in real-time by independent image analyzer using another image input on the analyzer. The analyzer is then will compare the target image to the one generated by the dynamic display. There will be acceptance criteria, including tolerances of the actual dynamic display image vs. the target image. The results of the comparison, such as dynamic image error feedback data, are then transmitted to the dynamic image controller. The control algorithm of the controller will be designed to use the feedback to tune the controls to bring the image generated by the dynamic display to within the acceptable tolerances reproducing the target image. The controller of the dynamic display can incorporate the image analyzer functions into one unit. The process is similar in function of reproduction and enlargement of an original image by a printer, except the electronic copying and enlargement process described in the application is related to real-time images being reproduced on a much greater scale within predefined acceptance criteria. The closed-loop method of tuning the controls in real-time to achieve the required level of reproduction is accomplished in real-time by the controller with or without assistance of an operator.

The proposed apparatus will allow to design and fabricate very large scale dynamic displays with unique dynamic illumination capabilities. These large dynamic displays will include: live TV streaming visible from long distances, just as the existing direct light systems, but also pleasantly viewable from short distances. The apparatus and method of controlling the apparatus described in this application will create unique opportunities for designing large and super large dynamic displays. The principal of parallel lighting or illumination of a Pix-Cell, which is then used as a light and/or image producing pixel to construct a large scale dynamic display, is unique. The method of controlling the Pix-Cell, as described in this application, includes methods of studying and analyzing the behavior of Pix-Cells as unique forms of pixels to be used in creating a large and super large dynamic displays. Based on empirical analysis, each type of Pix-Cell will be characterized and have detailed specifications, including relationship between applied controls and visual affects produced by the Pix-Cell. Based on testing, designs of a Pix-Cell can be adjusted to achieve required illumination affects under given control algorithm. Likewise, the control algorithm can be adjusted to attain required illumination affects from a given design of a Pix-Cell. The method of tuning the Pix-Cell and the control algorithm described in this application includes both. A dosed loop system can be created, where the control algorithm of a Pix-Cell is adjusted or tuned automatically based on visual analysis by an independent test device of the visual affects produced by a Pix-Cell. The Pix-Cell with its unique features is expected to outperform the existing LED RGB pixels, by creating soft visual transitions of dynamic images with practically unlimited color combinations. The dosed-loop controls of reproducing in real-time target images on a much larger scale dynamic displays with or without operator assistance is also unique. Unless noted otherwise, for simplicity the local controller is not shown on the drawings. The local controller can be installed on the same PCB as the illumination devices, or local controller can be installed on a separate PCB, which is interfaced to PCB containing illumination devices. The local controller will contain the drive circuitry for providing controlled power to illumination devices.

Unless noted otherwise, for simplicity the sensors for monitoring: temperature, proximity, ambient light, power available to drive the illumination devices, are not shown on the drawings. The sensors can be installed on: the same PCB as the illumination devices; on the same PCB as local controller; on separate PCB; or hard-wired by harness.

Unless noted otherwise, for simplicity the network interface, such as wireless including INTERNET, is not shown on the drawings.

Unless noted otherwise, for simplicity the illumination devices are referred to as LED's.

Also for simplicity, the directions of illumination produced by LED's are shown as arrows, indicating the main direction of the maximum illumination. The overall illumination of an LED includes a section, such as a sphere symmetrical to the main direction, and can vary between 60 degrees angle to 120 degrees angle. The layout of the support flexible channel can be configured to control the illumination sphere produced by some or all LED's supported by the channel. For example, the Pix-cell can use LED's with a 120 degrees illumination angle, and the support channel can impact the illumination sphere produced by each LED either symmetrically down to 80 degrees, or impacting only one side of the illumination sphere, creating asymmetrical illumination sphere. Apparatus compatible with DC plug and power distribution. Method of controls including a number of pix-cells forming a system, with control algorithm of individual pix-cells, supporting applications, including: real-time reproduction of video streams on a super large scale; illumination of static images, including super large billboards. System configuration including: front, in-line and backlighting illumination, creating 3-D effects, as needed.

FIG. 1 Illustrates front view example of an existing discrete LED pixels (1) of a section of a display (2), such as billboard. Light generated by (1) is directed toward an observer.

FIG. 2 Illustrates side view of section (2) shown on FIG. 1. The LED pixels (1) generate light in the direction (3), perpendicular to the illuminated surface, toward an observer. This principal is defined as a direct view illumination.

FIG. 3 Illustrates front view of a parallel view Pix-Cell (10), configured as a rectangular shape with 4 illumination devices. Configuration of illumination devices, such as LED's, includes:
  1) Single color for all illumination devices
  2) Multi-color, such as RGB, for all illumination devices
  3) Combination of single color and RGB, assigned to specific illumination devices Pix-Cell (10) control configurations include:
  1) ON/OFF—applicable to all or selected illumination devices of the Pix-Cell
  2) Light intensity controls—applicable to all or selected illumination devices within the Pix-Cell
  3) Light dynamic effects, such as blinking at various frequencies and duty cycles—applicable to all or selected illumination devices within the Pix-Cell
  4) Color controls, applicable to all or selected RGB illumination devices Controller for the Pix-Cell (10) is not shown for simplicity. Each illumination device, such as LED, can be configured independently from other illumination devices. The Pix-Cell (10) configuration includes Controller configured to support specific configuration of LED devices within the Pix-Cell, controlling parameters of each LED listed above. Controller configurations also include: local, remote, and combination of both. For illustration purposes, the Pix-Cell (10) is shown with four LED's. In general, a Pix-Cell can be configured with a greater number of LED's, and besides generating parallel lighting or illumination in respect to an observer, the Pix-Cell can be configured to have practically unlimited range of illumination characteristics. The configurations available for the Pix-Cell, include: variety of number of LED's; variety of layouts of LED's within the Pix-Cell; variety of type of LED's; and variety of control configurations applied to LED's. The LED configurations are based on LED specifications, and include: type, size, power, illumination properties. Configurations of controls applied to the LED's include: one control for each LED; one control for a group of LED's; independent control of each LED. The configuration of the illumination include: back illumination (Pix-Cell is located behind the illumination target); front illumination (Pix-Cell is located in-front of the illumination target); in-line illumination (Pix-Cell is located in-line with the illumination target); and any combination of back/front applied to the entire illumination target, or sections of the illumination target.

Example 1 of Pix-Cell (10) configuration.

Both LED's on the left side, labeled (11), and are configured as single color LED's, while both LED's on the right side, labeled (13), and are configured as RGB. The controller of the Pix-Cell (10) configured as a local controller with wireless addressable interface from a remote host controller. The local controller upon request of the host controller will turn LED's (11) ON at 50% intensity level relative to maximum level listed in specifications for LED's (11), while dynamically changing colors and intensities of the LED's (13). The host controller configuration will include control algorithm, and the control algorithm configurations including one or combination of: repeatable sequences, independent of external events; controls as function of external events, such as: condition of the ambient environment—light, moving object, temperature; controls as a function of external controls received by the host controller from independent device, such as real-time video streaming signals.

The figure components are labeled as follows:

11—Individual LED's configured to direct their light in direction (12) parallel to the illumination surface, facing an observer.

13—Individual LED's positioned across from LED's (11), and configured to direct their light in direction (14) also parallel to the illumination surface, defined as the surface facing the observer.

The interior surfaces of the parallel view Pix-Cell (10) can be configured to control the following illumination parameters generated by LED's (11) and (13): light retention, light diffusion, light reflection. The layout of LED's within the parallel view Pix-Cell, together with the interior surfaces, can be configured to provide required illumination of the illuminated surface, which can include: uniformed illumination, example LED's (11) and (13) are generating steady uniformed color; multi-color illumination with variable light intensities, as example when each LED within (11) and (13) is providing independent color and light intensity; combination of steady state and dynamic illumination applied to selected sections of the illuminated surface, example one LED of group (11) can be blinking while remaining LED's of group (11) and (13) are staying ON.

In general, a Pix-Cell is defined as an independent illumination component configured for providing parallel view illumination functions within a system of Pix-Cells, as illustrated on FIG. 10 and others, as described later in this paragraph of the Specifications. In comparison to existing pixel oriented displays, the Pix-Cell from a system point of view, is considered as an illumination pixel, with the exception of the functionality and variety of configurations available for the Pix-Cell are significantly greater vs. existing pixel. Existing pixels, such as RGB LED's, have control parameters related to: color and intensity. The Pix-Cells, in addition to color and intensity, have a significantly greater number of configurable parameters as described in this application. In respect to Pix-Cell, a system of Pix-Cells can be designed using the same type of Pix-Cells, or any combination of various Pix-Cells, starting with each Pix-Cell being unique, or grouped Pix-Cells with the same properties. One of the most significant advantages of the Pix-Cells over existing Pixels, include: configurable physical layout of the Pix-Cells. Non intelligent Pix-Cell, as a component, consists of: enclosure, illumination devices, mounting components for illumination devices, control interface. The configuration parameters for the Pix-Cell enclosure include: shape or layout, which can vary from rectangular shape, round shape to practically any desired shape; construction, such as number of sides installed, and with weather-proof rating or not; material properties of the inner sides of the enclosure to control illumination parameters, such as: light retention, light diffusion, light reflection; mechanical interface to other Pix-Cell enclosures to be attached to selected sides of the enclosure. The configuration parameters for the Pix-Cell Illumination devices, include: number and type of LED's, including single color, or RGB; mounting method, such as regular PCB, flex PCB or in-harness mount; location within the enclosure of the Pix-Cell; electronics to control light intensity generated by LED's, such as current limiting resistors. The configuration parameters for the Pix-Cell control interfaces include: hardwired connectors, which can be daisy-chained between adjacent Pix-Cells. The intelligent Pix-Cell will in addition include: sensors, controller, and controller interface. The configuration parameters for the intelligent Pix-Cell sensors include: type of sensor, such as temperature, current; sensor trigger points, including the ones related to self-diagnostics, which are stored in the non-volatile memory. The configuration parameters for the intelligent Pix-Cell controller include: electronics to control illumination parameters of the LED's within the Pix-Cell, and control algorithm defining Pix-Cell functionality, stored in the non-volatile memory. The configuration parameters for the intelligent Pix-Cell controller interface include: electronics for daisy-chaining controls with adjacent Pix-Cells, wireless interface, including INTERNET, to a local or remote host controller. The layout of LED's within the parallel view Pix-Cell, together with the interior surfaces, can be configured to provide required illumination of the illuminated surface, which can include: uniformed illumination, as example: all powered LED's are generating steady uniformed color; multi-color illumination with variable light intensities, as example: each or selected number of LED's providing independent color and light intensity; combination of steady state and dynamic illumination applied to selected LED's, resulting in unique illumination of sections of the illuminated surface, example: one LED of group can be blinking while remaining LED's are staying ON. Each Pix-Cell with unique configuration can be analyzed in its behavior, just like a 'black box', documenting results attained from the Pix-Cell based on controls applied to the Pix-Cell, which will result in generating Pix-Cell specifications. The Pix-Cell parameters, including: shape, layout of LED's, size—can be configured for a specific application. In respect to rectangular shape billboards, the shape of the Pix-Cell can be: squared with dimensions from 1" square to 4" square; rectangular with each side dimensions between 1" and 4". In respect to billboards, rectangular shape billboards can include round shape Pix-Cells, as well as unique shaped Pix-Cells. Same applies to billboards which have an unique shape. The illustrations include a number of Pix-Cell configurations in terms of: layout or shape; and the number of illumination devices, such as LED's, located within the Pix-Cells. The configuration of each Pix-Cell, including its shape, can vary. An illumination device can be configured based on using one type of a Pix-Cell, or using a combination of various Pix-Cells, including the Pix-Cells with different shapes and number of illumination devices inside them. In addition to physical configuration, a device, such as billboard, can be configured to have controls applied to individual Pix-Cells or group of Pix-Cells, and the controls can be configured depending on location of the Pix-Cell within the device. The Pix-Cells with a local controller can be configured with local controller to run self-diagnostics, including monitoring ambient environment surrounding the Pix-Cell, and controller in real-time without operator assistance, adjusting controls of the Pix-Cell to sustain the Pix-Cell operation within specification parameters of the Pix-Cell.

The apparatus configurations include:

1) The source of light are solid-state light producing devices.
2) Solid-state light producing devices are defined as solid-state components which convert energy from an applied power source to generate light.
3) Power source for solid-state light producing devices includes electrical power, such as voltage source, and/or current source.
4) Solid-state devices include: single color LED's, and multi-color LED's such as RGB type.
5) The solid-state devices are positioned in a direction to shine their light parallel to the surface they intend to illuminate, i.e. parallel to the eyes of an observer.
6) The solid-state devices are grouped to create a Pix-Cell.
7) The shape and size of the Pix-Cell is designed to achieve the objective of a given application, and includes: triangular shapes, rectangular shapes, round shape, other shapes as needed.
8) Solid-state devices, such as LED's are aligned along the inner perimeter of the Pix-Cell shining their light in a direction parallel to the illuminated surface seen by an observer.
9) The design includes a single row of solid-state light producing devices wrapped around the inner perimeter of the Pix-Cell, and a multi-row of solid-state light producing devices aligned side-by-side and installed along the inner perimeter of the Pix-Cell.
10) An individual row of solid-state light producing devices is referenced as a string of light.
11) The Pix-Cell can have the entire or section of the inner perimeter populated with solid-state light producing devices (strings of light), as described above.
12) A single string of light can consist of one type or combination of several types of solid-state light producing devices. Example: single color LED's can be grouped into a string with RGB type of LED's, and sequence of arranging the string can include alternating between single color LED and RGB LED.
13) Control algorithm of the Pix-Cell includes real-time control, which is defined as application in real-time of specified energy to solid-state light producing devices individually, and/or in groups, such as strings, with an objective to produce an illumination of the Pix-Cell where the solid-state light producing devices are installed.
14) Combination of Pix-Cells can be used to create a large scale dynamic displays.
15) Dynamic display can be designed in terms of shape, size, illumination properties, controls, using Pix-Cells of the same type.
16) Dynamic display can be designed in terms of shape, size, illumination properties, controls, using Pix-Cells of different type.
17) The control algorithm of a dynamic display can vary for each individual Pix-Cell to achieve required illumination effects.
18) The selection of the Pix-Cells for dynamic display will depend on the specifications of the dynamic display, including: power requirements, illumination requirements, overall size, range of dynamic visual effects, resolution or granularity from a specified distance.
19) Individual designs of Pix-Cells can be characterized by applying a known control algorithm to the Pix-Cell and then analyzing via independent image analyzer the image quality produced by the Pix-Cell. Based on results of the analysis, a control table of the Pix-Cell can be created, which would list the command or controls applied and visual affects attained.

20) The methods described in the application include real-time control of individual and/or groups of Pix-Cells to create desired real time dynamic displays of large and super large dimensions, and controls including video data streams similar to the formats of the digital video and digital television.

21) The methods described in this application also include digital image copying, which is defined as follows: a control image, considered as a target image, is reproduced on a small scale such as existing TV set, and then electronically copied to a large dynamic display consisting of Pix-Cells. This target image is then recorded in real-time and analyzed by an independent image analyzer using one of the image inputs on the analyzer. Controls are applied to a dynamic display consisting of Pix-Cells and the image produced by the dynamic display is then also analyzed in real-time by independent image analyzer using another image input on the analyzer. The analyzer is then will compare the target image to the one generated by the dynamic display. There will be acceptance criteria, including tolerances of the actual dynamic display image vs. the target image. The results of the comparison, such as dynamic image error feedback data, are then transmitted to the dynamic image controller. The control algorithm of the controller will be designed to use the feedback to tune the controls to bring the image generated by the dynamic display to within the acceptable tolerances reproducing the target image. The controller of the dynamic display can incorporate the image analyzer functions into one unit. The process is similar in function of reproduction and enlargement of an original image by a printer, except the electronic copying and enlargement process described in the application is related to real-time images being reproduced on a much greater scale within predefined acceptance criteria. The closed-loop method of tuning the controls in real-time to achieve the required level of reproduction is accomplished in real-time by the controller with or without assistance of an operator.

The apparatus will allow to design and fabricate very large scale dynamic displays with unique dynamic illumination capabilities. These large dynamic displays will include: live TV streaming visible from long distances, just as the existing direct light systems, but also pleasantly viewable from short distances. The parallel view pix-cells will allow to provide soft illumination, including backlighting, of art, as well as to create opportunity to design billboards, including super large size billboards. The plug and power principals of interfacing the pix-cells will allow to simplify installation and maintenance.

The parallel view pix-cells are configurable to create flexible illumination patterns.

The parallel view pix-cells are configurable to provide a variety of illuminations, including:

front illumination, when the pix-cell is positioned in-front of the illumination surface; in-line illumination when the illumination surface is positioned inside the pix-cell; back illumination, or backlighting, when the pix-cell is positioned behind the illumination surface.

The controls of parallel view pix-cells are configurable to provide a variety of illuminations, including controls of the light parameters, such as: color; intensity, special dynamic effects such as blinking, rolling colors.

FIG. 4 Illustrates front view of a parallel view Pix-Cell (15), configured as a rectangular shape with 6 illumination devices. The figure components are labeled as follows:

11—Individual LED's configured to direct their light in direction (+X) parallel to the illumination surface, facing an observer.

13—Individual LED's positioned across from LED's (11), and configured to direct their light in direction (−X) also parallel to the illumination surface, defined as the surface facing the observer.

16—Individual LED configured to direct its light in direction (17) parallel to the illumination surface, facing an observer.

18—Individual LED configured to direct its light in direction (19) parallel to the illumination surface, facing an observer.

The larger the number of illumination devices within a Pix-Cell, the greater the number of lighting effects it will produce under directions of a controller. In mathematical terms, the number of possible states of a Pix-Cell will be based on possible number of states of each individual LED within the Pix-Cell.

For example, considering the Pix-Cell (15) containing 6 independent LED's, and considering only discrete states of independent LED's, such as: ON, OFF, red, blue, green, ON-blinking 50/50, red-blinking 50/50, blue-blinking 50/50, green-blinking 50/50, which amounts to 10 states per LED. This configuration will allow controller to execute 1,000,000 unique states for the Pix-Cell (15).

FIG. 5 Illustrates side view of a parallel view Pix-Cell (15) shown on FIG. 4. All LED devices within the Pix-Cell (15) are configured for directing their light parallel in respect to illumination surface (31). Figure components are labeled same as on FIG. 4.

FIG. 6 Illustrates front view of a parallel view Pix-Cell (41), configured as a rectangular shape with 2 illumination devices. The figure components are labeled as follows:

11—Individual LED configured to direct its light in direction (+X) parallel to the illumination surface, facing an observer.

13—Individual LED positioned on the opposite side from LED (11), and configured to direct its light in direction (−X) also parallel to the illumination surface, defined as the surface facing the observer.

30—Inner surfaces of the Pix-Cell (41) configured to direct illumination generated by the LED's (11) and (13) toward the illumination surface.

FIG. 7 Illustrates front view of a parallel view Pix-Cell (40), configured as a rectangular shape with 2 illumination devices. The figure components are labeled as follows:

11—Individual LED configured to direct its light in direction (+X) parallel to the illumination surface, facing an observer.

13—Individual LED positioned straight across on the opposite side from LED (11), and configured to direct its light in direction (−X) also parallel to the illumination surface, defined as the surface facing the observer.

30—Inner surfaces of the Pix-Cell (41) configured to direct illumination generated by the LED's (11) and (13) toward the illumination surface.

FIG. 8 Illustrates front view of a PCB (21) configured for Pix-Cell (15) shown on FIG. 4.

The PCB (21) will provide mechanical support and electronic connections for LED devices (11, 13, 16, 18). Remaining components are labeled same as on FIG. 4.

11—Individual LED's configured to direct their light in direction (12) parallel to the illumination surface, facing an observer.

13—Individual LED positioned across on the opposite side from LED's (11), and configured to direct its light in direction (-X) also parallel to the illumination surface, defined as the surface facing the observer.

30—Inner surfaces of the Pix-Cell (20) configured to direct illumination generated by the LED's (11) and (13) toward the illumination surface.

Figure 1:
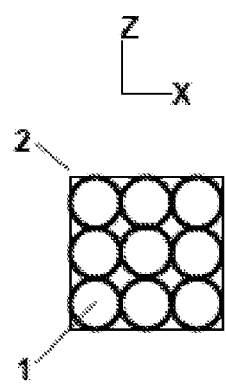
Figure 2:
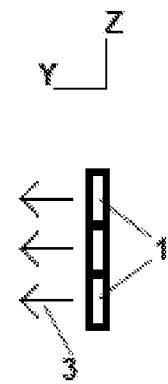
Figure 3:
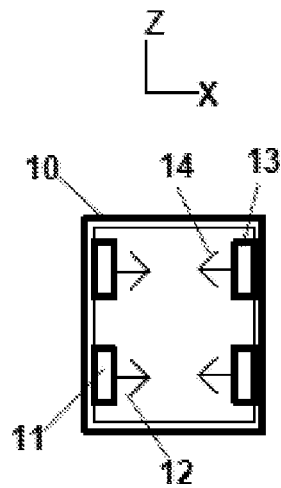
Figure 4:
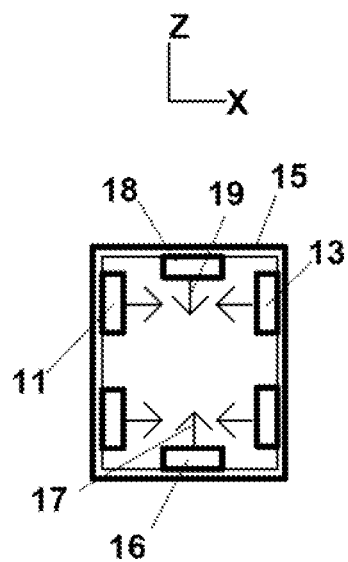
Figure 5:
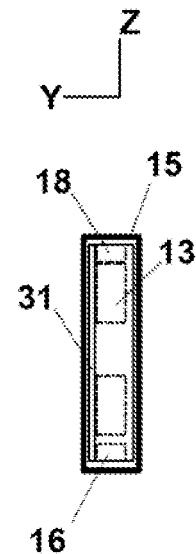
Figure 6:
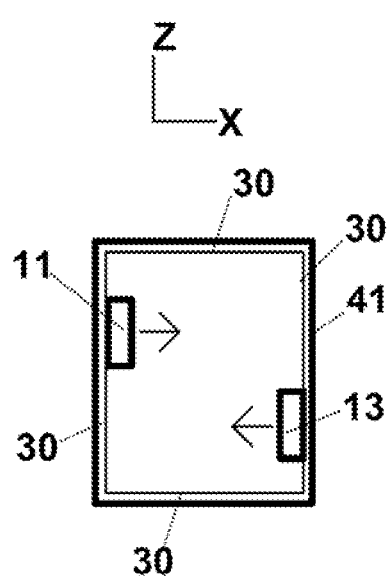
Figure 7:
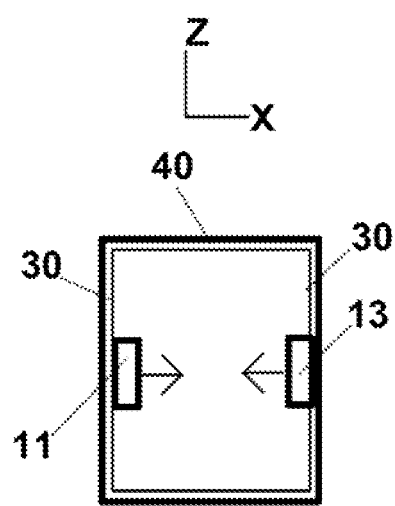
Figures 8, 9:
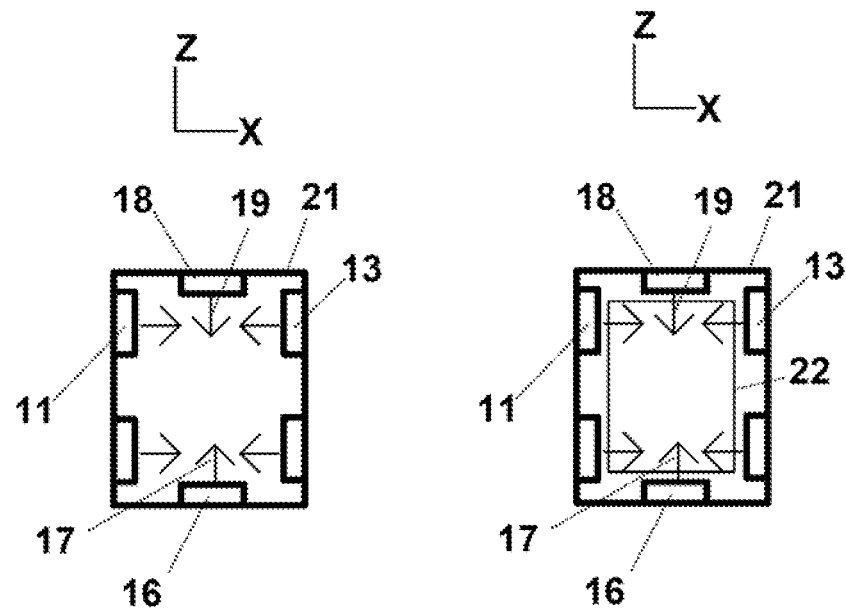
FIG. 9 illustrates front view of the PCB (21) shown on FIG. 8 with addition of a large solder pad (22), which is configured to provide: heat sinking from LED's installed on (21), and direct the light generated by the LED's toward the illuminated surface facing an observer.
Figure 10:
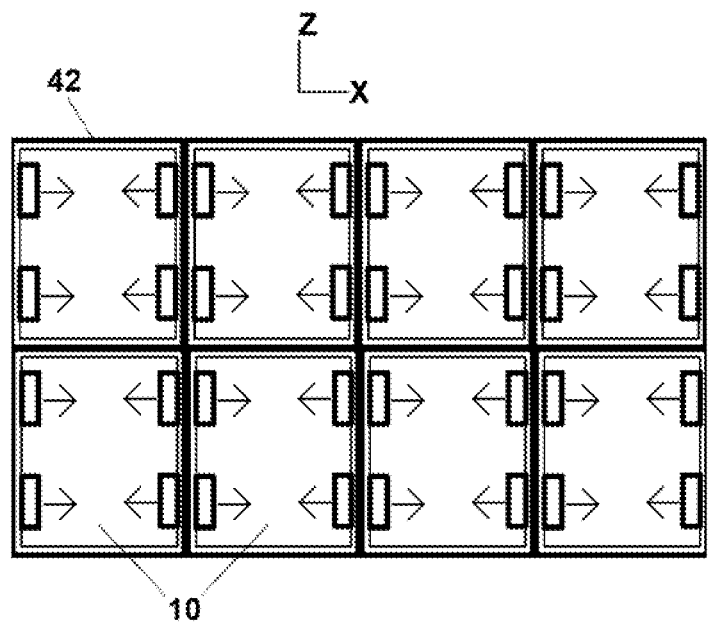
FIG. 10 Illustrates front view of a display device (42), such as billboard, which is configured using total of 8 Pix-Cells (10) shown on FIG. 3.
Figure 11:
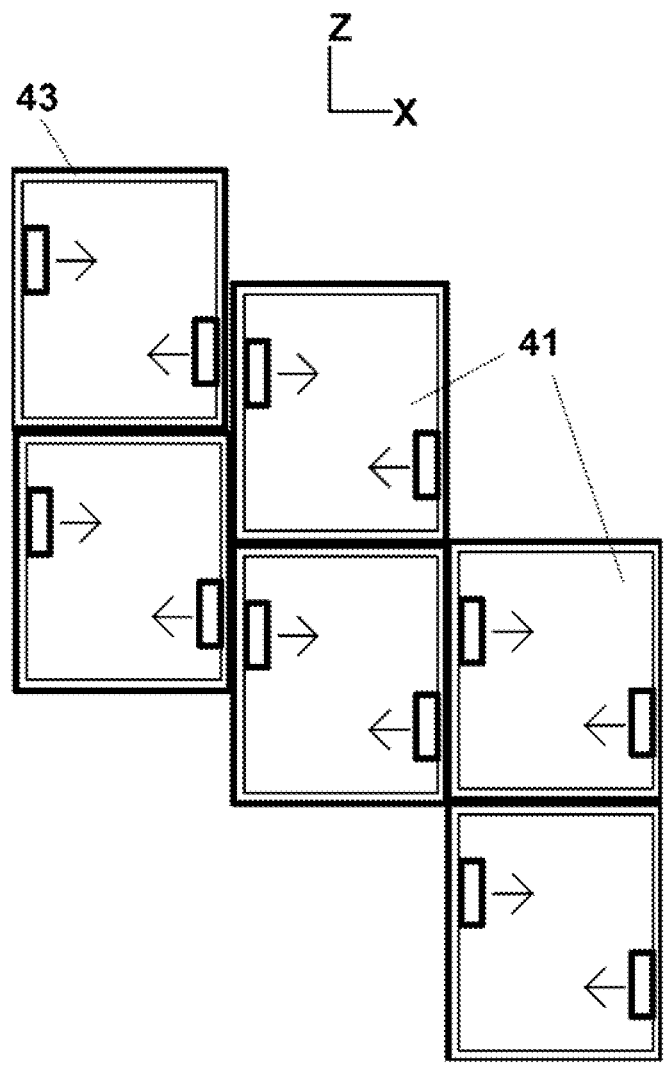
FIG. 11 Illustrates front view of a display device (43), which is configured using total of 6 Pix-Cells (41) shown on FIG. 6.
Figure 12:
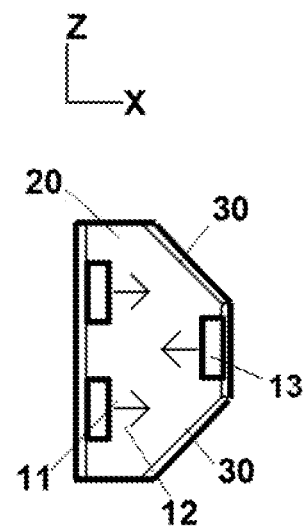
FIG. 12 Illustrates front view of a parallel view Pix-Cell (20), configured with a layout as shown, and containing 3 illumination devices. The figure components are labeled as follows.
Figure 13:
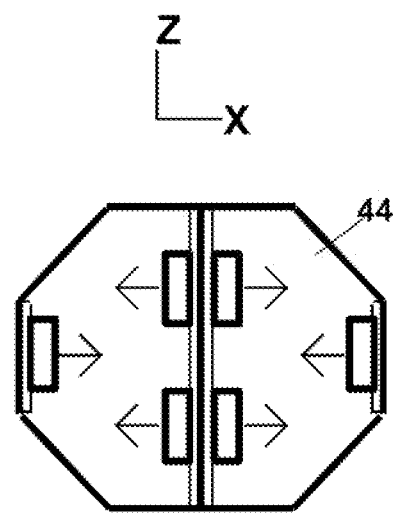

FIG. 13 Illustrates front view of a display device (44), which is configured using total of 2 Pix-Cells (20) shown on FIG. 6.

Figure 14:
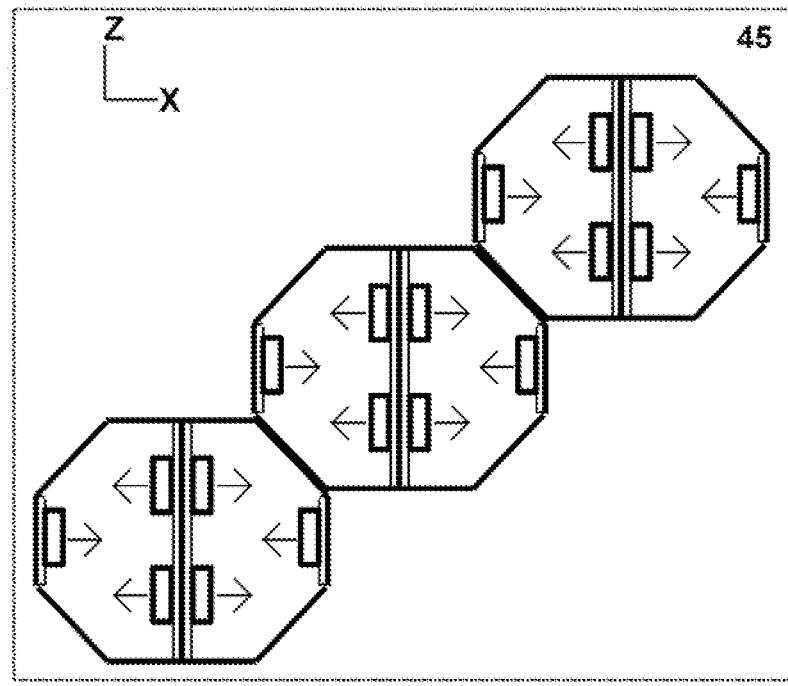

FIG. 14 Illustrates front view of a display device (45), which is configured using total of 6 Pix-Cells (20) shown on FIG. 6.

Figure 15:
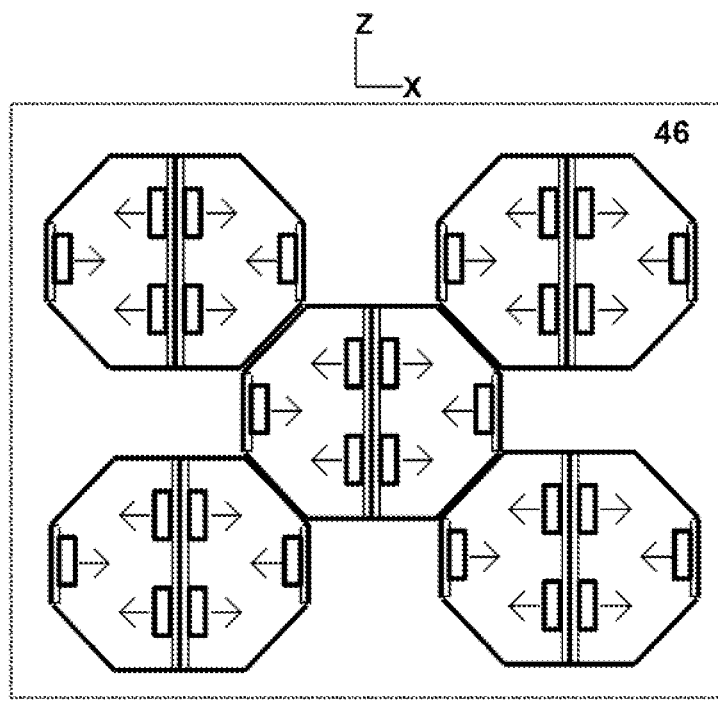

FIG. 15 Illustrates front view of a display device (46), which is configured using total of 10 Pix-Cells (20) shown on FIG. 6.

Figure 16:
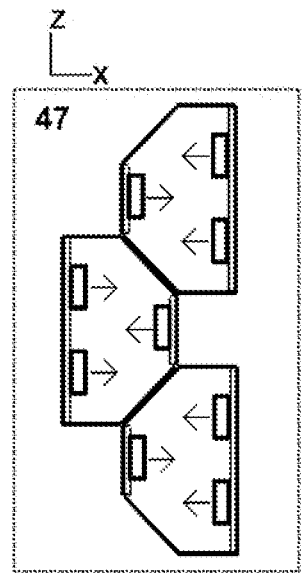

FIG. 16 Illustrates front view of a display device (46), which is configured using total of 3 Pix-Cells (20) shown on FIG. 6.

Figure 17:
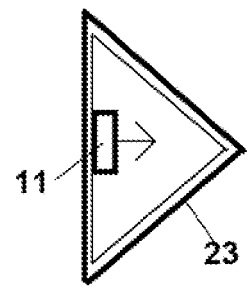

FIG. 17 Illustrates front view of a parallel view Pix-Cell (23), configured with a layout as shown, and containing 1 illumination device (11). The Inner surfaces of the Pix-Cell (23) configured to direct illumination generated by the LED (11) toward the illumination surface.

Figure 18:
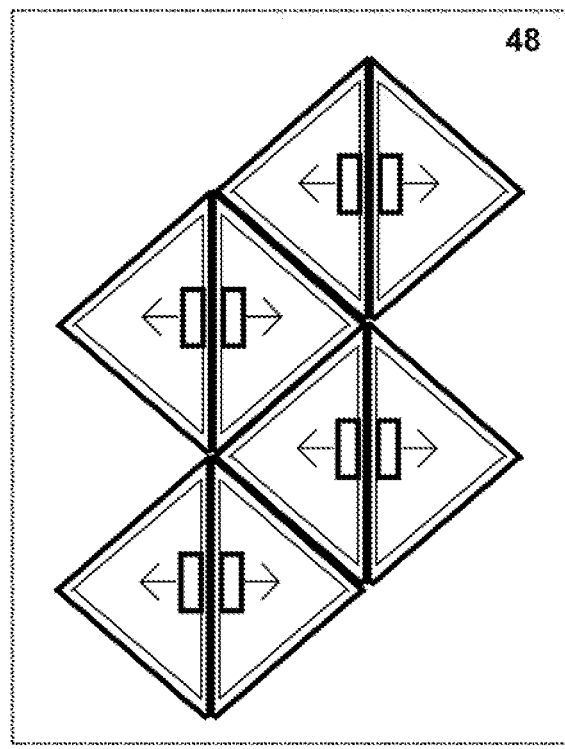

FIG. 18 Illustrates front view of a display device (48), which is configured using total of 8 Pix-Cells (23) shown on FIG. 17.

Figure 19:
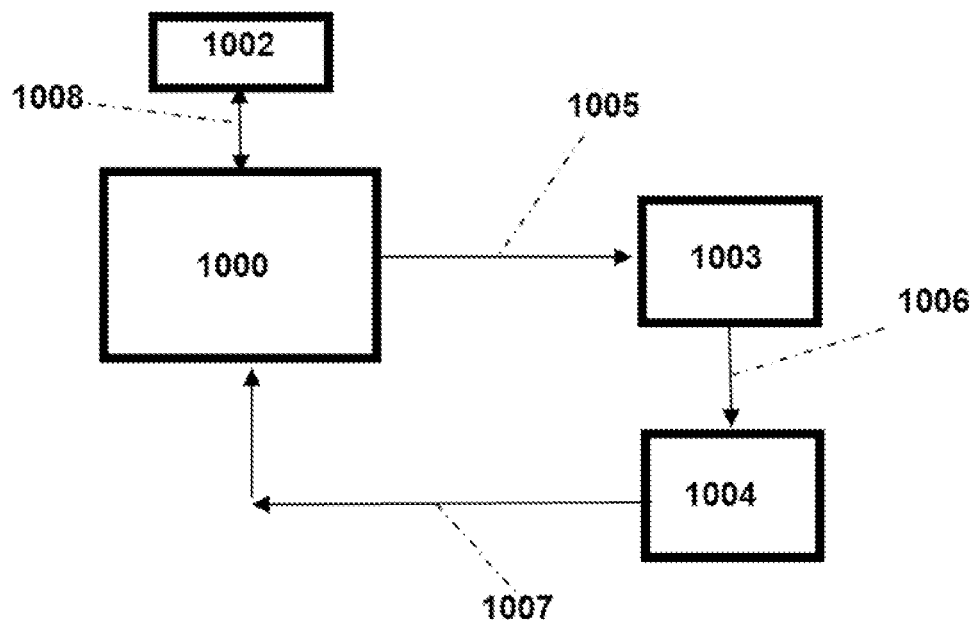

FIG. 19 Illustrates a diagram of a controller (1000) configured for performing a characterization process of a pix-cell (1003). The controller (1000) is configured to execute a characterization control algorithm stored in the non-volatile memory (1002), and the algorithm is configured for characterization of the pix-cell (1003).

The control algorithm will include: controls to be applied by (1000) to the (1003) and acceptance criteria of respective results produced by the (1003). The results produced by (1003) are labeled as (1006), and can include: illumination parameters, power consumption, safety parameters. The results produced by (1003) are measured by sensors (1004), and reported to (1000). The controller (1000) according to the algorithm will send controls to (1003) over control interface (1005) and measure the results from (1004) received over sensor interface (1007). The controls applied to (1003) over (1005), which produce results by (1003) measured by (1004) over (1006), which in turn are reported by (1004) to the controller (1000) via (1007), and which are established by the controller (1000) to be within acceptance criteria stored in (1002) will be recorded via interface (1008) by the controller (1000) in the non-volatile memory (1002). The acceptance criteria for the results produced by (1003) under a given control applied by (1000) can include a range of acceptable parameters, example: acceptable range of colors produced by (1003); acceptable range of brightness produced (1003); acceptable range of power consumed by (1003). The controls applied by (1000) to (1003) include: static and dynamic controls. Respectively, the results produced by (1003) include static and dynamic results. The algorithm can include several confirmation cycles of applying the same controls by the (1000) to (1003) with an objective to verify the acceptable criteria of repeatability of results produced by (1003) under the same command applied by (1000). The characterization control algorithm will include: type of controls to be applied by (1000) to (1003), example: ON/OFF switching of power; color selection; illumination intensity; controls which are unique for specific type pix-cell (1003) selected for characterization.

The sensors (1004) are configured to measure result parameters produced by the (1003) under control of (1000). The results include: visual effects, power consumption, safety parameters. The controller (1000) will analyze the results, and determine if they are within the acceptance criteria defined by the algorithm. The accepted results will be recorder by (1000) in the non-volatile memory (1002). The configuration of recording the results by (1000) in the (1002) include: environment ID; pix-cell ID (identification); control ID applied; result ID obtained. The characterization control algorithm will include specific environment settings or parameters for conducting the characterization, example: ambient environment of temperature, humidity, external light. The characterization control algorithm configured for the pix-cell (1003) will include the controller (1000) to summarize the results of characterizing (1003), and the summary can be used as a specification of the pix-cell (1003) with the pix-cell ID recorded for identification purposes. The algorithm can request additional information to be added to the specifications, including: description of (1003), and description of other parameters for clear readability. The individual parameters of the results will be analyzed by the (1000), and a respective function as result vs. controls, or result as function of applied control will be established. The function can be discrete, or analog. The recorded characterization or specifications of the pix-cell (1003) will be used by controller (1000), and other controllers within the apparatus, or a system of apparatuses, to apply respective controls to (1003) in order to obtain respective results produced by (1003). The characterization process including configuration of the controller applying known controls to the pix-cell and the controller analyzing the illumination produced by the pix-cell; and result of the characterization analyzed by the controller and stored in a non-volatile memory; and based on the results, the controller applying specific controls to the pix-cell, and the pix-cell generating the illumination according to characterization results.

The controls of at least one individual parameter producing a result by a pix-cell can be executed per respective function of a pix-cell, with the function listed in the pix-cell specifications. Example: intensity of illumination produced by the pix-cell is a function of applied voltage, and the function itself described in the specifications, and the function listing the limitations (minimum, maximum) to sustain required reliability of the pix-cell.

The diagram shown on FIG. 19 can be configured for operating as a closed-loop real-time control system for the Pix-Cell (1003). The controller (1000) per control algorithm stored in (1002) applying controls (1005) to pix-cell (1003), and then analyzing the results (1006) by monitoring sensors (1004) via (1007). The control algorithm directing the controller (1000) to adjust in real-time the controls (1005) of (1003) to bring the results (1006) generated by the (1003) to within the acceptance criteria of the control algorithm.

For apparatus configured as a system, the controller (1000) configuration can include interface to a remote controller (not shown for simplicity), and the control algorithm executed by all controllers, will be sustaining operation of the system within the acceptance criteria. The configuration of the interface between controllers including wireless network for mobile devices, LAN and INTERNET.

Figure 20:
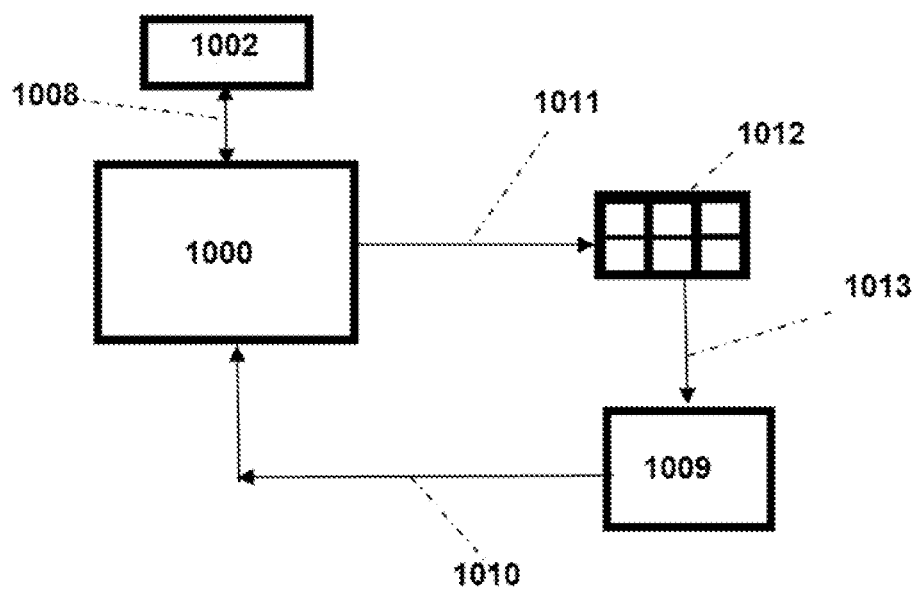

FIG. 20 Illustrates a diagram of a controller (1000) configured for performing a characterization process of a display module (1012). The display module (1012) is configured to include at least one pix-cell, six are shown for illustration purposes. The controller (1000) is configured to execute a characterization control algorithm stored in the non-volatile memory (1002), and the algorithm is configured for characterization of the module (1012). The control algorithm configurations include: controls to be applied by (1000) via (1011) interface to the (1012), and acceptance criteria of respective results produced by the (1012), measured by sensors (1009) via interface (1013), and then reported by (1009) to the controller (1000) via interface (1010). For simplicity, the results produced by (1012) are labeled as (1013), and can include: illumination parameters, power consumption, safety parameters. The results produced by (1012) are measured by sensors (1009), and reported to (1000) via interface (1010). The controller (1000) according to the algorithm will send controls to (1012) over control interface (1011) and measure the results from (1009) received over sensor interface (1010). The controls which produce results within acceptance criteria will be recorded via interface (1008) by the controller (1000) in the non-volatile memory (1002). The acceptance criteria for the results produced by (1012) under a given control applied by (1000) can include a range of acceptable parameters, example: acceptable range of colors produced by (1012); acceptable range of brightness produced (1012); acceptable range of power consumed by (1012), acceptable range of dynamic affects produced by (1012). The controls applied by (1000) to (1012) include: static and dynamic controls. Respectively, the results produced by (1012) include static and dynamic results. The algorithm can include several confirmation cycles of applying the same controls by the (1000) to (1012) with an objective to verify the acceptable criteria of repeatability of results produced by (1012) under the same command applied by (1000). The characterization control algorithm will include: type of controls to be applied by (1000) to (1012), including controls applied to entire (1012) or sections of, with a section defined as a pix-cell, or a group of pix-cells within the (1012). Example: ON/OFF switching of power of (1012) or sections of; color selection; illumination intensity; controls which are unique for specific type module (1012) selected for characterization. The sensors (1009) are configured to measure result parameters produced by the (1012) under control of (1000). The results include: visual effects, power consumption, safety parameters. The controller (1000) will analyze the results, and determine if they are within the acceptance criteria defined by the algorithm. The accepted results will be recorder by (1000) in the non-volatile memory (1002). The configuration of recording the results by (1000) in the (1002) include: environment ID; module ID (identification); control ID applied; result ID obtained. The characterization control algorithm will include specific environment settings or parameters for conducting the characterization, example: ambient environment of temperature, humidity, external light. The characterization control algorithm configured for module (1012) will include the controller (1000) to summarize the results of characterizing (1012), and the summary can be used as a specification of the pix-cell (1012) with a module ID recorded. The algorithm can request additional information to be added to the specifications, including: description of (1012), and description of other parameters for clear readability. The individual parameters of the results will be analyzed by the (1000), and a respective function as result vs. controls, or result as function of applied control will be established. The function can be discrete, or analog. The recorded characterization or specifications of the module (1012) will be used by controller (1000), and other controllers within the apparatus, or a system of apparatuses, to apply respective controls to (1012) in order to obtain respective results produced by (1012). The controls of at least one individual parameter producing a result by a module can be executed per respective function of a module listed in the module specifications. The characterization process including configuration of the controller applying known controls to the module and the controller analyzing the illumination produced by the module; and result of the characterization analyzed by the controller and stored in a non-volatile memory and based on the results, the controller applying specific controls to the module, and the module generating the illumination according to characterization results.

Example: intensity of illumination produced by the module is a function of applied voltage, and the function itself described in the specifications, and the function listing the limitations (minimum, maximum) to sustain required reliability of the module.

The diagram shown on FIG. 20 can be also configured for operating as a closed-loop control system for the module (1012). The controller (1000) per control algorithm stored in (1002) applying controls (1011) to the module (1012), and then analyzing the results (1013) by monitoring sensors (1009) via (1010). The control algorithm directing the controller (1000) to adjust in real-time the controls (1011) of (1012) to bring the results (1013) generated by the (1012) to within the acceptance criteria of the algorithm.

The individual pix-cells of the (1012) can be pre-characterized prior of being added to (1012), with each pix-cell having a known identification, and respective configuration and specifications. The identification of these pix-cells will be established by the controller (1000), and respective specifications of each pix-cell will be obtained by the controller (1000 from (1002). For (1012) consisting of pix-cells with established specifications, the control algorithm configurations will include controller (1000) applying controls to (1012) based on specifications of each pix-cell of the display (1012).

The individual pix-cells of the (1012) can be un-characterized prior of being added to (1012), with each pix-cell not having a known identification, and not having respective specifications.

In either case, the display (1012) will be characterized by the controller (1000), and respective specifications recorded by the (1000) in the (1002).

For apparatus configured as a system, the controller (1000) configuration can include interface to a remote controller (not shown for simplicity), and the control algorithm executed by all controllers, will be sustaining operation of the system within the acceptance criteria. The configuration of the interface between controllers including wireless network for mobile devices, LAN and INTERNET.

Figure 21:
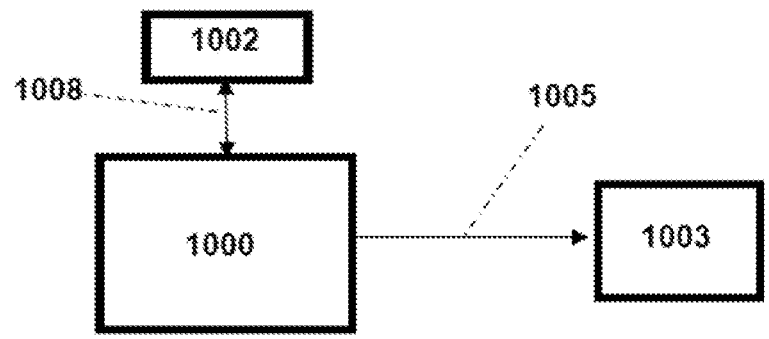

FIG. 21—Illustrates a diagram of a controller (1000) configured for performing open-loop control of a pix-cell (1003)

over the interface (1005). A control algorithm stored in the non-volatile memory (1002) is configured to include controls based on: specifications of (1003); and acceptance criteria of results to be produced by (1003) when a respective control (1005) is applied. The algorithm will instruct the controller (1000) to apply respective controls (1005) to the (1003), and to achieve results produced by (1003) per know specifications of the (1003). As needed, the open-loop control diagram configuration can include controller (1000) monitoring the ambient environment to ensure the pix-cell (1003) is operated within the specifications. For apparatus configured as a system, the controller (1000) configuration can include interface to a remote controller (not shown for simplicity), and the control algorithm executed by all controllers, will be sustaining operation of the system within the acceptance criteria. The configuration of the interface between controllers including wireless network for mobile devices, LAN and INTERNET.

Figure 22:
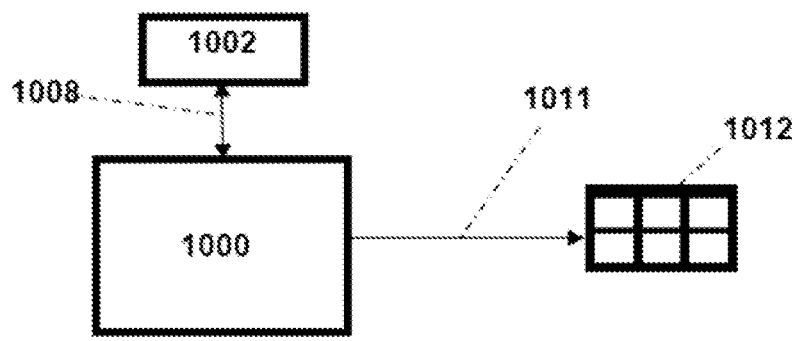

FIG. 22—Illustrates a diagram of a controller (1000) configured for performing open-loop control of a module (1012) via interface (1011). A control algorithm stored in the non-volatile memory (1002) is configured to include controls based on: specifications of (1012); and acceptance criteria of results to be produced by (1012) when a respective control (1011) is applied to (1012). The algorithm will instruct the controller (1000) to apply respective controls (1011) to the (1012), and to achieve results produced by (1012) per know specifications of the (1012). As needed, the open-loop control diagram configuration can include controller (1000) monitoring the ambient environment to ensure the module (1012) is operated within the specifications. For apparatus configured as a system, the controller (1000) configuration can include interface to a remote controller (not shown for simplicity), and the control algorithm executed by all controllers, will be sustaining operation of the system within the acceptance criteria. The configuration of the interface between controllers including wireless network for mobile devices, LAN and INTERNET.

Figure 23:
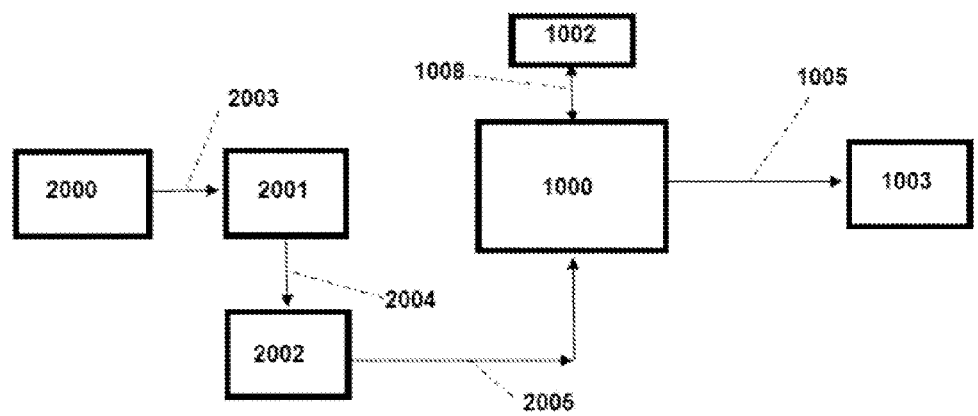

FIG. 23—Illustrates a diagram of an open loop control configuration of a pix-cell (1003) by controller (1000) via control interface (1005). The controller (1000) executes control algorithm stored in non-volatile memory (1002). An independent controller (2000) controls an independent illumination device (2001), and the image data (2004) produced by the (2001) are monitored by an independent sensor (2002), which is connected to the controller (1000) via interface (2005). The configuration of the control algorithm includes configuration requiring the controller (1000), based on the image data obtained from (2002) via (2005), and based on the (1003) specifications—to apply controls (1005) to pix-cell (1003), and the (1003) producing illumination within acceptance criteria included in the algorithm. The pix-cell (1003) configurations include configuration with an intelligent embedded local controller. The pix-cell identification can be embedded into the pix-cell local controller, and then obtained by the controller (1000) via interface (1005) between the controller (1000) and the embedded local controller of the pix-cell (1003). The embedded local controller of the pix-cell (1003) will be configured with a non-volatile memory, and the non-volatile memory configurations include configuration for retaining: pix-cell identification; control algorithm; interface algorithm. The identification of the pix-cell (1003) includes configurations using barcode labels attached to the pix-cell. The controller (1000) configurations include configuration supporting automatic recognition of a pix-cell identification using a sensor (not shown for simplicity) connected to the controller (1000), and the sensor configured to read the pix-cell identification. Based on the pix-cell (1003) identification, the controller (1000) can obtain from the non-volatile memory (1002), or a remote controller (not shown for simplicity), specifications for the pix-cell (1003). For apparatus configured as a system, the controller (1000) configuration can include interface to the controller (2000), and/or an interface to a remote controller (not shown for simplicity), and the control algorithm executed by all controllers, will be sustaining operation of the system within the acceptance criteria. The configuration of the interface between controllers including wireless network for mobile devices, LAN and INTERNET.

Figure 24:
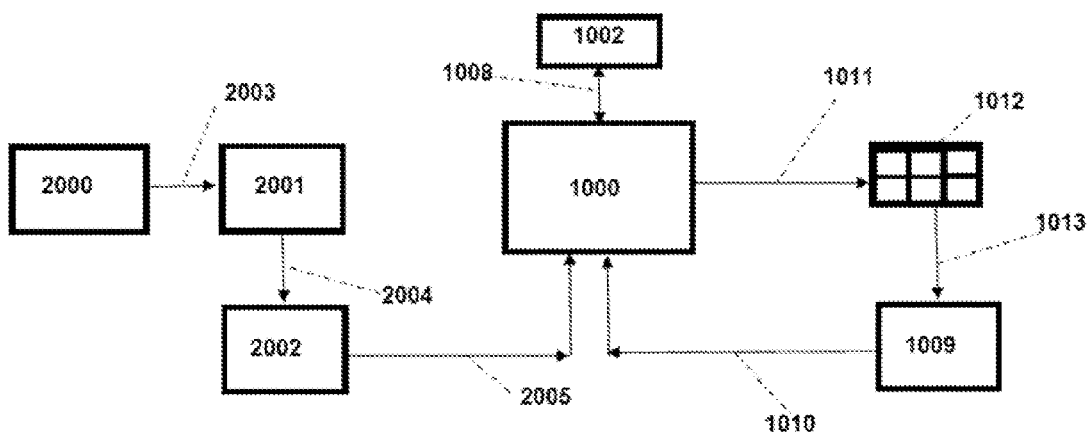

FIG. 24—Illustrates a diagram of a closed loop control configuration of a module of pix-cells (1012) by controller (1000) via control interface (1011). The controller (1000) executes control algorithm stored in non-volatile memory (1002). An independent controller (2000) controls an independent illumination device (2001), and the image data (2004), labeled target image, produced by the (2001) is monitored by an independent sensor (2002), which is connected to the controller (1000) via interface (2005). For reference, the image produced by the module (1012) as result of controls (1011) applied by controller (1000), is labeled as actual image (1013). The configuration of the control algorithm includes configuration requiring the controller (1000), based on:

a) The target image (2004) obtained by controller (1000) from (2002) via (2005)

b) The specifications for the module (1012) provided by the algorithm, and c) The measured by the controller (1000) via sensor (1009) the actual image (1013) produced by the module (1012)

for the controller (1000) to generate real-time controls (1011) applied to the module (1012) in order to maintain the actual image (1013) within acceptance criteria from the target image (2004).

The module (1012) configurations include configuration with an intelligent embedded local controller. The module identification can be embedded into the module local controller, and then obtained by the controller (1000) via interface (1011) between the controller (1000) and the embedded local controller of the module (1012). The embedded local controller of the module (1012) will be configured with a non-volatile memory, and the non-volatile memory configurations include configuration for retaining: module identification; control algorithm; interface algorithm. The identification of the module (1012) includes configurations using barcode labels attached to the module. The controller (1000) configurations include configuration supporting automatic recognition of a module identification using a sensor (not shown for simplicity) connected to the controller (1000), and the sensor configured to read the module (2012) identification. Based on the module (2012) identification, the controller (1000) can obtain from the non-volatile memory (1002), or a remote controller (not shown for simplicity), specifications for the module (1012).

The control algorithm configurations include configuration requiring the controller (1000) to perform self-tuning of the controls (1011) applied to (1012), and to maintain the acceptance criteria configured to minimize the differences between the actual image (1013) produced by (1012) and the target image (2004) produced by (2001).

The control algorithm configurations include configuration requiring the controller (1000) to perform self-tuning of the controls (1011) applied to (1012) in order to generate the actual image (1013) as a specific scale (larger or smaller) from the target image (2004), and the acceptance criteria configured to include a requirement, minimizing the image quality differences between the actual image (1013) produced by (1012) and the target image (2004) produced by (2001). The target image (2004) configurations include one or combination of: static display; dynamic display; real-time video images, such as movies. For apparatus configured as a system, the controller (1000) configuration can include interface to the controller (2000), and/or an interface to a remote controller (not shown for simplicity), and the control algorithm executed by all controllers, will be sustaining operation of the system within the acceptance criteria. The configuration of the interface between controllers including wireless network for mobile devices, LAN and INTERNET.

Figure 25:
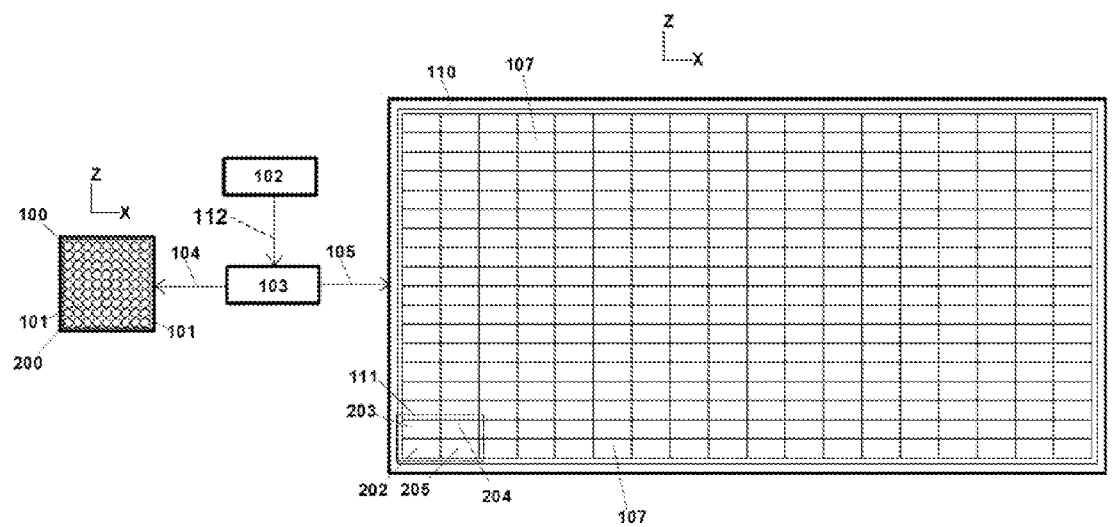

FIG. 25 Illustrates a diagram of an apparatus configured for reproducing images from a relatively small size display device (100), such as TV, to a relatively large scale display device (110). The apparatus and method of controlling the apparatus described in this application provide unique opportunities for designing large and super large dynamic displays. The principal of parallel lighting or illumination of a Pix-Cell, which is then used as a light and/or image producing pixel to construct a large scale dynamic display, is unique. The method of controlling the Pix-Cell, as described in this application, includes methods of studying and analyzing the behavior of Pix-Cells as unique forms of pixels to be used in creating a large and super large dynamic displays. Based on empirical analysis, each type of Pix-Cell will be characterized and have detailed specifications, including relationship between applied controls and visual affects produced by the Pix-Cell. Based on testing, designs of a Pix-Cell can be adjusted to achieve required illumination affects under given control algorithm. Likewise, the control algorithm can be adjusted to attain required illumination affects from a given design of a Pix-Cell. The method of tuning the Pix-Cell and the control algorithm described in this application includes both. A dosed loop system can be created, where the control algorithm of a Pix-Cell is adjusted or tuned automatically based on visual analysis by an independent test device of the visual affects produced by a Pix-Cell. The Pix-Cell with its unique features is expected to outperform the existing LED RGB pixels, with the Pix-Cell creating soft visual transitions of dynamic images with practically unlimited color combinations. The dosed-loop controls of reproducing in real-time target images on a much larger scale dynamic displays with or without operator assistance is also unique. The apparatus and the method of controlling the apparatus, will allow creating high quality super large dynamic images, which are pleasantly viewable even from a very close distances. In addition, utilization of Pix-Cells with a multi-row illumination strips stacked side-by-side along the inner perimeter of the Pix-Cell will allow to create unique 3-D effects, as the Pix-Cell will add visual depth as one of control parameters. The apparatus described in this application includes configurations, supporting:

1) Parallel view, in respect to the viewer eyes, illumination, including: front, in-line, backlighting
2) Flexible patterns
3) Closed loop controls optimizing use of devices and available power resources
4) Reproduction of visual effects on a larger scale using optical sensors
5) Reproduction of live video streams on a larger scale through hi-speed DSP
6) Self-diagnostics, to ensure reliable and safe operations at all times
7) Sensor interfaces
8) Controls of individual LED or group of LED's, including controls initiated by: an user directly via remote, or voice commands; remote controller.
9) Number of flex patterns for an art, controlled independently or in correlation to a preset algorithm selected by a command sent from:
    a) User remote
    b) Local controller based on: sensors; preset timing; or a control process, including synchronization with music controller
    c) Remote host
10) Controls include synchronization with other devices, including audio (music)
11) Plug and power distribution, with controls for easy maintains
12) Teach mode, including a system recording the control sequence step-by-step and then executing the recorded sequence or portion of on a command Components are labeled as follows:

100—Display device consisting of a number of pixels (101)

101—Illumination pixel, such as RGB LED, of the device (100). One of these pixels is labeled (200).

102—Device configured for generating controls, such as video signals, for the device (103), and sending the controls over the interface (112), which can be configured as either wired or wireless, including INTERNET

103—Device configured for receiving controls, such as video signals, from the device (102). The device (103) is then further configured to generate based on controls received from (102) specific controls for the device (100) over the interface (104), which can be configured as either wired or wireless, including INTERNET, and the device (103) further configured to send specific controls for the device (110) over the interface (105), which can be configured as either wired or wireless, including INTERNET. The configuration of the control algorithm of the (103) includes generating a small scale image on (100), and a magnified or larger scale same content image on (110). For example, as shown, controls generated by (103) for pixel (200) of the (100) can be correlated to controls generated by (103) for Pix-Cells (202, 203, 204, 205), and as result, the image displayed by the pixel (200) is magnified by using 4 larger scale Pix-Cells of (110), which together form a magnified image of (200) on a section (111) consisting of four Pix-Cells (202 through 205). The configuration of acceptance criteria for the device (103) of reproducing original image displayed on (100) on the larger scale (110) will depend on specifications of the selected Pix-Cells (107) of the (110), and configuration includes approximation of the original image displayed on (100) by a respective larger scale image displayed on (110). The controls in respect to (102) and (103) are illustrated in greater details on FIG. 26

107—Individual Pix-Cell configured as a rectangular shape with a number of illumination devices inside the Pix-Cell generating illumination in direction parallel to an observer. The (107) configuration includes wireless interface for receiving controls from (103) via (105)

110—Display device which is configured to include a number of Pix-Cells (107). The display device (110) can be configured as a large scale billboard magnifying images displayed on a smaller scale TV or billboard (100).

111—Section of the display device (110), consisting of four Pix-Cells (202 through 204).

For apparatus configured as a system, the controller (103) configuration can include interface to a remote controller (not shown for simplicity), and the control algorithm executed by all controllers, will be sustaining operation of the system within the acceptance criteria. The configuration of the interface between controllers including wireless network for mobile devices, LAN and INTERNET.

Figure 26:
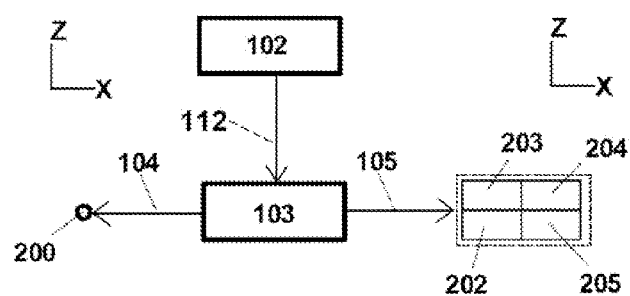

FIG. 26—Illustrates details of the control devices (102) and (103) shown on FIG. 25, which are configured to generate real-time controls for pixel (200), and correlated controls for Pix-Cells (202 through 205). The process described below will apply to an apparatus configuration of reproducing illumination generated by an individual pixel (200) by illumination produced on a larger scale by an individual Pix-Cell, such as (202), as an example.

Components are labeled as follows:

102—Device configured for generating controls, such as video signals, for the device (103), and sending the controls over the interface (112), which can be configured as either wired or wireless, including INTERNET 103—Device configured for receiving controls, such as video signals, from the device (102). The device (103) is then further configured to generate based on controls received from (102) specific controls for the device (100) over the interface (104), which can be configured as either wired or wireless, including INTERNET, and the device (103) further configured to send over the interface (105) specific controls for the Pix-Cells of the device (110) shown on FIG. 25. The interface (105) can be configured as either wired or wireless, including INTERNET. The configuration of the control algorithm of the (103) includes generating a small scale image on (100), and a magnified or larger scale same image on Pix-Cells of (110). For example, as shown, controls generated by (103) for pixel (200) of the (100) can be correlated to controls generated by (103) for Pix-Cells (202, 203, 204, 205), and as result, the image displayed by the pixel (200) is magnified by using 4 larger scale Pix-Cells of (110), which together form a magnified image of (200) on a section (111) consisting of four Pix-Cells (202 through 205).

The configuration of acceptance criteria for the device (103) of reproducing original image displayed on (100) on the larger scale (110) will depend on specifications of the selected Pix-Cells (107) of the (110), and configuration includes approximation of the original image displayed on (100) by a respective larger scale image displayed on (110).

Figure 27:
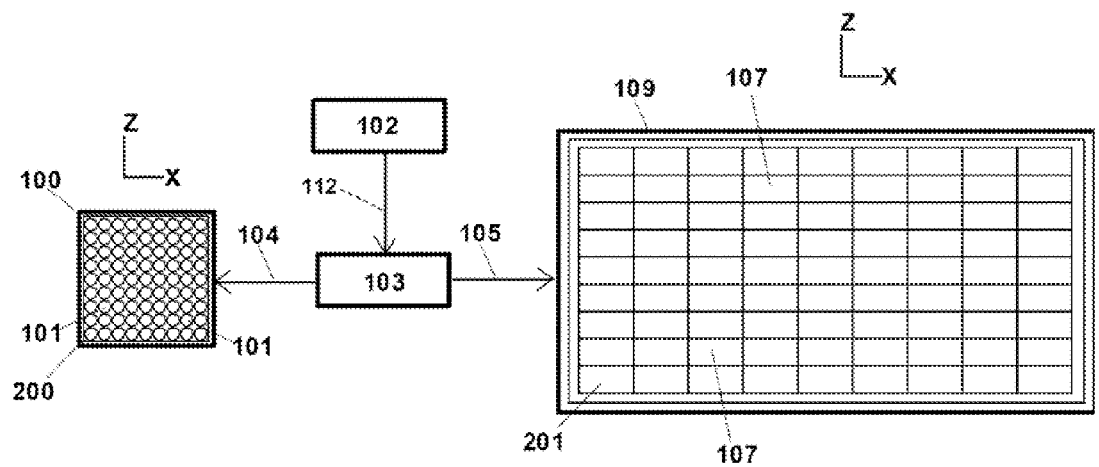

FIG. 27 Illustrates a diagram of an apparatus configured for reproducing images from a relatively small size display device (100), such as TV, to a relatively large scale device (109). This is similar to the diagram shown on FIG. 25 with an exception that the original image generated on pixel (200) are correlated by the control device (103) to a single Pix-Cell (201) of the display device (109). Remaining elements are labeled as on FIG. 25.

Figure 28:
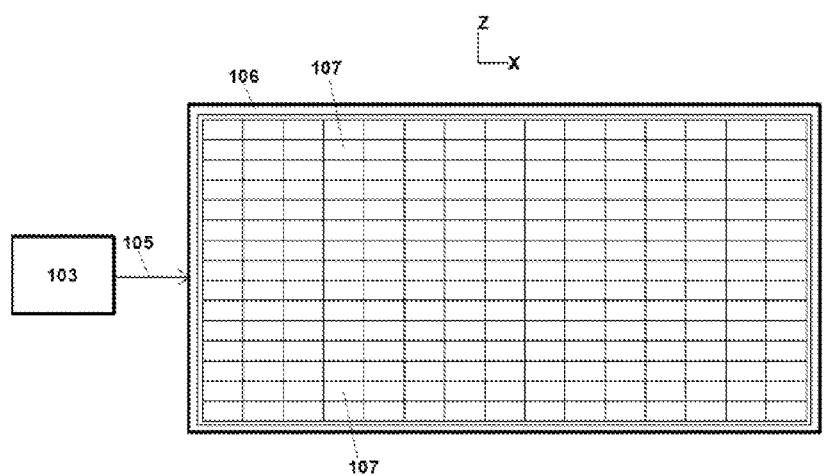

FIG. 28 Illustrates a diagram of an apparatus configured for direct control of a relatively large scale display device (106). Components are labeled as follows:

103—Device configured for generating controls, such as video signals, for display device (106) over the interface (105), which can be configured as either wired or wireless, including INTERNET. The configuration of the interface (105) includes wireless or wired interface for each Pix-Cell (107) of (106). The configuration of controls include unique controls generated by (103) for each individual Pix-Cell (107) of the display device (106). The method of controlling each Pix-Cell (107), includes methods of studying and analyzing the behavior of each unique configuration of the Pix-Cell installed in the display device (106). Based on empirical analysis, each type of Pix-Cell will be characterized and have detailed specifications, including relationship between applied controls and visual affects produced by the Pix-Cell. Based on test results and obtained specification for each unique Pix-Cell, configuration of the Pix-Cell can be adjusted to achieve required illumination affects under given control algorithm. Likewise, the control algorithm can be adjusted to attain required illumination affects from a given configuration of a Pix-Cell. The configuration of controls generated by (103) includes method of tuning the Pix-Cell and the control algorithm to achieve set acceptance criteria. A dosed loop system can be created, where the control algorithm executed by (103) of a given Pix-Cell (107) is adjusted or tuned automatically based on visual analysis by an independent test device (not shown for simplicity) of the visual affects produced by the Pix-Cell. The configuration of controls generated by (103) includes: controls applied to all Pix-Cells, controls provided to a group of Pix-Cells, controls applied to individual Pix-Cells, and any combination of above.

107—Individual Pix-Cell configured as a rectangular shape with a number of illumination devices inside the Pix-Cell generating illumination in direction parallel to an observer. Configuration of each Pix-Cell within (106) can be unique, and the difference between configurations of the Pix-Cells can include: shape, physical size; number and layout of illumination devices, such as LED's within the Pix-Cell; control features, specifications in respect to illumination produced by each Pix-Cell. For simplicity, as shown, all Pix-Cells (107) of the (106) have the same physical configuration. The configuration of Pix-Cell (107) includes wireless interface for receiving Pix-Cell specific controls from (103) via (105).

Figure 29:
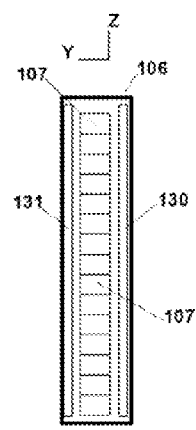

FIG. 29 Illustrates side view of the display device (106) shown on FIG. 28, with a configuration including a component in the back (130) and a component on the front (131). Components are labeled as follows:

130—Component of the (106), configuration of which includes reflecting the illumination generated by Pix-Cells (107) in the direction (+Y) toward the illumination surface viewed by an observer. The (106) configuration includes flat panel with the side facing the Pix-Cells (107) configured for reflecting the light in the direction (+Y), such as a panel with a mirrored surface.

131—Component of the (107), configuration of which includes diffusing the illumination produced by Pix-Cells (107) as viewed by an observer. The (106) configuration includes flat panel in-front of the Pix-Cells (107) configured for diffusing the illumination produced by the Pix-Cells.

FIG. 30 Illustrates a diagram of an apparatus configured for direct control of a relatively large scale display device (106) by a remote controller (150).

Components are labeled as follows:

150—Remote controller configured for generating controls, such as video signals, for each of the Pix-Cells (107) of the display device (106) over the wireless interfaces (151).

The configuration of controls include unique controls generated by (150) for each individual Pix-Cell (107) of the display device (106). The configuration of controls by (150) includes simultaneous controls of Pix-Cells (107). The method of controlling each Pix-Cell (107), includes methods of studying and analyzing the behavior of each unique configuration of the Pix-Cell (107) installed in the display device (106). Based on empirical analysis, each type of Pix-Cell (107) will be characterized and have detailed specifications, including relationship between applied controls by (150) and visual affects produced by the Pix-Cells (107). Based on test results and obtained specification for each unique Pix-Cell, configuration of the Pix-Cell can be adjusted to achieve required illumination affects under given control algorithm by remote controller (150).

FIG. 31 Illustrates side view of the display device (106) shown on FIG. 30, with a configuration including a component in the back (130) and a component on the front (131). Components are labeled as follows:

130—Component of the (106), configuration of which includes reflecting the illumination generated by Pix-Cells (107) in the direction (+Y) toward the illumination surface viewed by an observer. The (106) configuration includes flat panel with the side facing the Pix-Cells (107) configured for reflecting the light in the direction (+Y), such as a panel with a mirrored surface.

131—Component of the (107), configuration of which includes diffusing the illumination produced by Pix-Cells (107) as viewed by an observer. The (106) configuration includes flat panel in-front of the Pix-Cells (107) configured for diffusing the illumination produced by the Pix-Cells.

Figure 32:
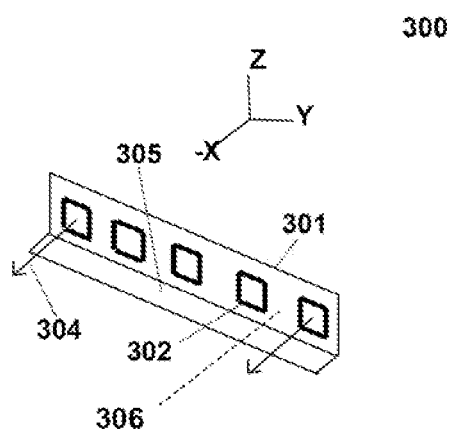

FIG. 32 Illustrates configuration of an apparatus (300) which includes illumination devices (302) installed on flexible circuit or flexible PCB (306), which can be further configured to create flexible illumination patterns or tracks. The flexible PCB (306) is supported by flexible "L-shape" channel, consisting of bottom section (305) and a vertical side (301). As shown, section of the "L-shaped" track formed by the (301, 305) is linear. The flexible channel (301, 305) is configured to provide support of the flexible PCB (301), and can be further configured for mounting to a surface, including flat surfaces, not shown for simplicity. Illumination devices (302) direct their light along (−X) axis, as indicated by (304). The configuration of controls of (302) includes control of lighting parameters such as: light retention, light reflection; light diffusion; light direction. Construction of the flexible channel (301, 305) is configured as L-shape. The L-shape consists of: bottom side, as pointed by (305) and the vertical side (301). The configuration of the channel (301, 305) includes: specific side of the channel, or a specific section of the channel made from materials affecting the light parameters: light retention, light reflection; light diffusion; light direction. The attachment method of the flexible PCB (306) to channel vertical side (301) includes use of adhesives. The attachment method of the flexible channel (305) to a support surface (not shown for simplicity) includes use of adhesives. The support surface includes: flat surfaces underneath (305); flat surface behind (301), to which (306) is attached; combination of both. Configuration of controller (not shown for simplicity) of illumination devices (302) includes: local controller installed on (306); remote controller; combination of both. For illumination, including backlighting, applications, the illuminated surface would be installed perpendicular to axis "Z", using parallel illumination generated by (302) for providing illumination, including backlighting, of the illuminated surface.

Figure 33:
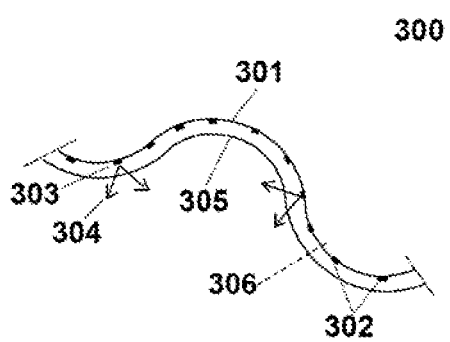

FIG. 33 Illustrates configuration of an apparatus (300) which includes illumination devices (302) installed on flexible circuit or flexible PCB (306), which can be further configured to create flexible illumination patterns or tracks. As shown, section of the track formed by the (301, 305) creating a wave-like layout. The flexible PCB (306) is attached to the side (301) and supported by flexible channel (301, 305). The flexible channel (301, 305) is configured to provide support of the flexible PCB (306), and can be further configured for mounting to a surface, including flat surfaces, not shown for simplicity. Illumination devices, including (302, 303), direct their light parallel to illumination service. The overall illumination produced by an LED includes a section, such as a sphere symmetrical to the main direction, and can vary between 60 degrees angle to 120 degrees angle. The layout of the support flexible channel can be configured to control the illumination sphere produced by some or all LED's supported by the channel. For example, the Pix-cell can use LED's with a 120 degrees illumination angle, and the support channel can reduce the illumination either symmetrically down to 80 degrees, or reduce only one side of the illumination sphere. As shown in this example, the illumination device (303) produces illumination sphere as indicated by (304), which is about 80 degrees. The configuration of the (301, 305) around any LED, including LED (303), can be selected to impact the size and the orientation of the illumination sphere produced by the LED, such as (303), and the adjustment can be symmetrical affecting both sides identically, or asymmetrical affecting each side independent of each other. The configuration of controls of (302, 303) includes control of lighting parameters such as: light retention, light reflection; light diffusion; light direction. Construction of the flexible channel (301, 305) is configured as L-shape.

Figure 34:
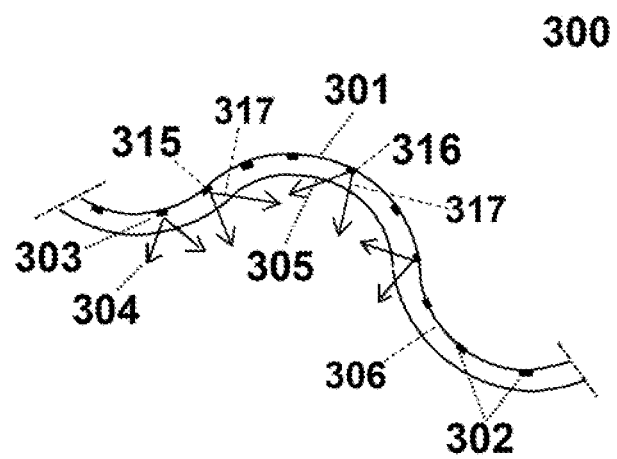

FIG. 34 Illustrates configuration of an apparatus (300) with the support channel (301, 305) configured with partitions (317). Partitions (317) can be configured as light reflective or light blocking partitions, and which are configured to impact the geometry of the illumination produced by an LED, such as LED (315) and LED (316) shown.

Figure 35:
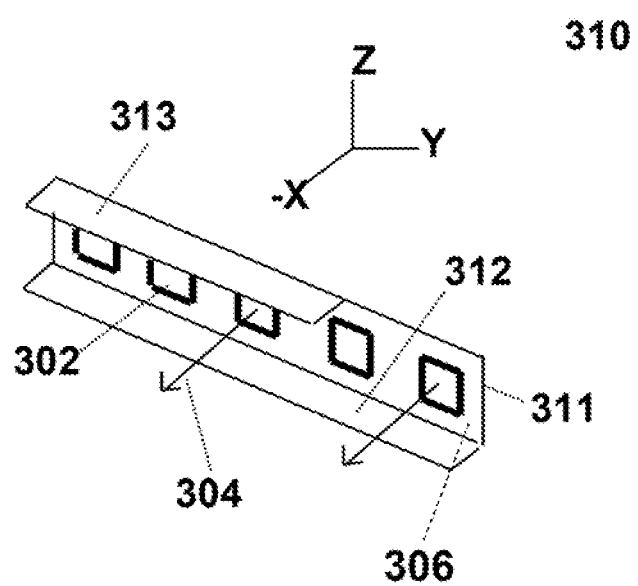

FIG. 35 Illustrates configuration of an apparatus (310) which includes illumination devices (302) installed on flexible circuit or flexible PCB (306), which can be further configured to create flexible illumination patterns or tracks. As shown, section of the track formed by the (312, 311, 313) as a "U-shape" is configured for in-line layout. The flexible PCB (306) is supported by the side (311) of the "U-shape" flexible channel (312, 311, 313). The flexible "U-shape" channel (312, 311, 313) is configured to provide support of the flexible PCB (306), and is further configured for mounting to a surface, including flat surfaces, not shown for simplicity. Illumination devices (306) direct their light along in direction indicated by (304). The configuration of controls of (306) includes control of lighting parameters such as: light retention, light reflection; light diffusion; light direction. Construction of the flexible channel (312, 311, 313) is configured as U-shape.

Figure 36:
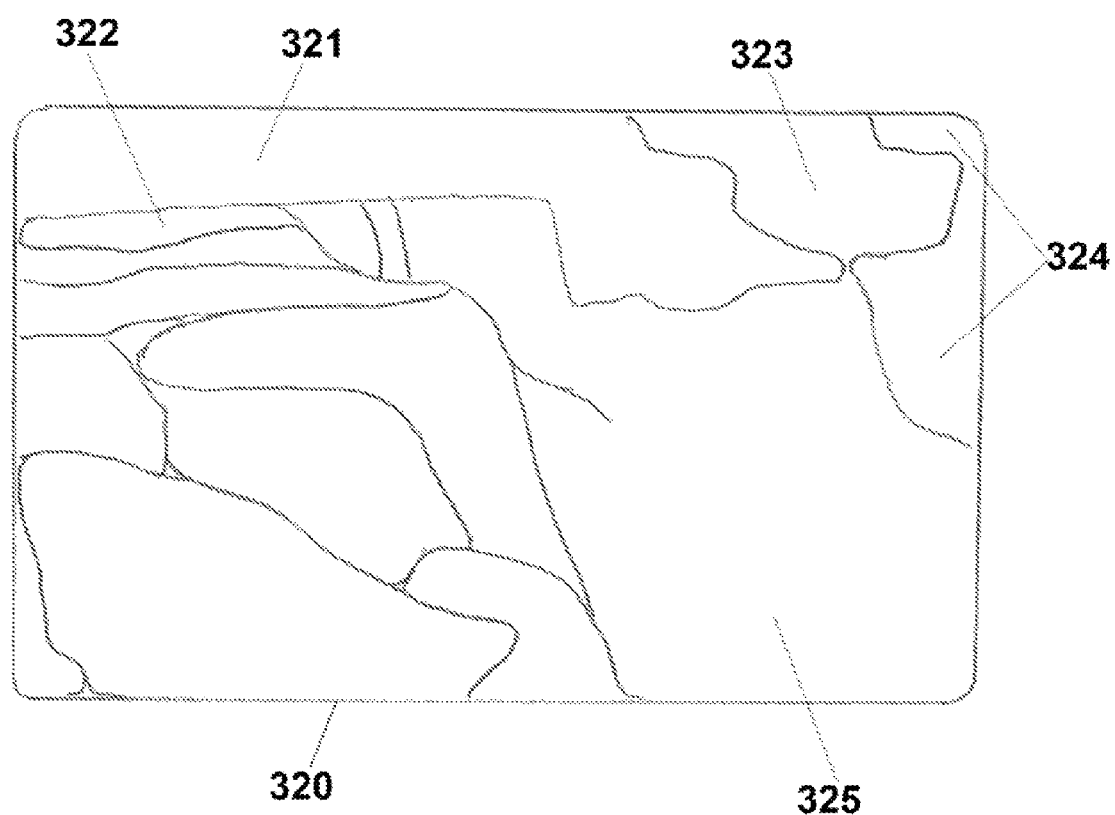

FIG. 36 Illustrates an example of an art, which is sectionalized for illumination by the apparatus containing pix-cells. Selection of the sections is based on the objective of the art, enhancing its appearance by illuminating each section with the configurable apparatus, as described on the FIG. 37. For simplicity, only few sections are identified by labels 320 through 325. The art configurations include: flat surfaces; not flat surfaces; sections consisting of flat and sections consisting of not flat; any combination of elements, which include: art, symbols, characters. The elements, such as art, and selection of sections can be originally designed based on application of the apparatus consisting of flexible Pix-Cells, which would allow optimization of the illumination features of the Pix-Cells. The elements, such as art, can be designed without knowledge of the apparatus, and then the apparatus would be configured with flexible Pix-Cells to maximize the desired illumination effects. Configurations of each pix-cell or group of pix-cells, and configurations of alignment and controls of the pix-cells include one or combination of: front/in-line/backlighting illumination as described on FIG. 37-40, including 3-D illumination effects.

Figure 37:
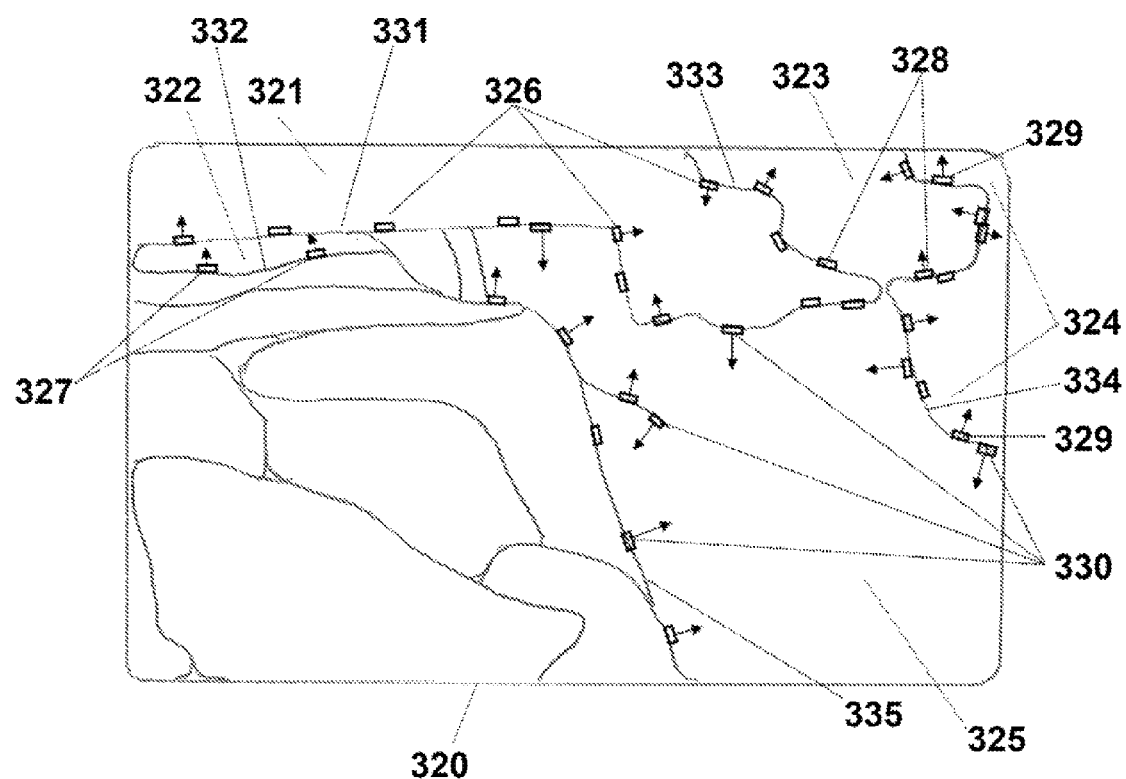

FIG. 37 Illustrates configuration of an apparatus for illuminating the art shown on FIG. 36.

For simplicity, the art backlighting using pix-cells, creating parallel view illumination. Apparatus configuration includes independent sections, with each section of the apparatus configured to match the layout of the elements being illuminated.

All LED's of the apparatus are configured and supported by flexible channels, and produce parallel view illumination, including backlighting, or illumination in respect to the surface being illuminated. For simplicity: not all sections of the art are illuminated, and the support channels for flexible LED PCB's comprising individual Pix-Cells, are not shown. Each section of the art can be illuminated by a flexible Pix-Cell with configuration independent of the flexible Pix-Cells used for illuminating other sections. Configuration parameters of the flexible Pix-Cell include: configuration of LED, number of LED's, density of LED's, configuration of support channels. Configuration of LED's include: type, color, size, illumination properties, controls. The parallel view pix-cells will allow providing soft illumination of the art, with each section of the art configured for section specific illumination method, including: front, back or in-line illumination. The parallel view pix-cells are configurable to create flexible illumination patterns. The parallel view pix-cells are configurable to provide a variety of illuminations, including: front illumination, when the pix-cell is positioned in-front of the illumination surface; in-line illumination when the illumination surface is positioned inside the pix-cell; back illumination, or backlighting, when the pix-cell is positioned behind the illumination surface. The controls of parallel view pix-cells are configurable to provide a variety of illuminations, including controls of the light parameters, such as: color; intensity; special dynamic effects such as blinking, rolling colors. The entire art, or selected sections of the art can be illuminated by pix-cells powered by battery backed power sources. Apparatus compatible with DC plug and power distribution. Method of controls including a number of pix-cells forming a system, with control algorithm of individual pix-cells. System configuration including: front, in-line and backlighting illumination, creating 3-D effects, as needed. Arrows are indicating the direction of the light generated by respective illumination devices, LED's.

For simplicity, the art (320) is illuminated by pix-cells (331) through (335) installed behind the art, providing backlighting of the art.

Components are labeled as follows:

321—Section of the art (320), illuminated by the pix-cell (331)

331—Pix-cell configured with LED devices (326) providing illumination as indicated by respective arrows

322—Section of the art (320), illuminated by the pix-cell (332)

332—Pix-cell configured with LED devices (327) providing illumination as indicated by respective arrows

323—Section of the art (320), illuminated by the pix-cell (333)

333—Pix-cell configured with LED devices (328) providing illumination as indicated by respective arrows

324—Section of the art (320), illuminated by the pix-cell (334)

334—Pix-cell configured with LED devices (329) providing illumination as indicated by respective arrows

325—Section of the art (320), illuminated by the pix-cell (335)

Figure 38:
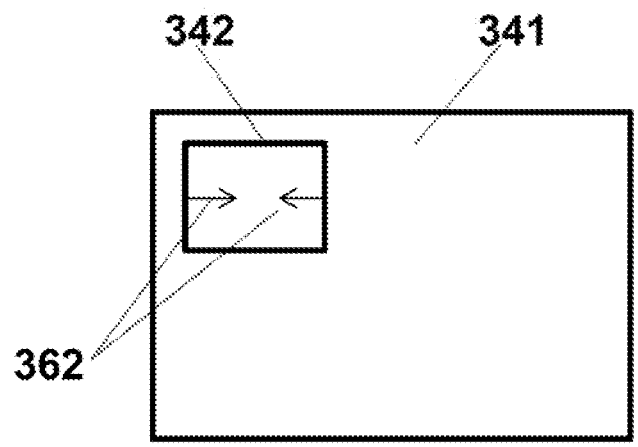

335—Pix-cell configured with LED devices (330) providing illumination as indicated by respective arrows FIG. 38 Illustrates configuration example of a front illumination of a section of the surface (341) by the pix-cell (342) positioned in-front of the (341). The configurations of the illumination of (341) include: number and type of pix-cells, and their location in-front of the (341). The configuration parameters of each pix-cell (342) include: shape (rectangular shown as an example); location, number and type of LED's installed along the inner perimeter of the (342); mounting methods, including attachment methods of the (342) to the (341), or mounting the (341) and the pix-cells (342) from a common surface, such as a wall. For simplicity, the pix-cell (342) is shown configured as a rectangular shape.

Figure 39:
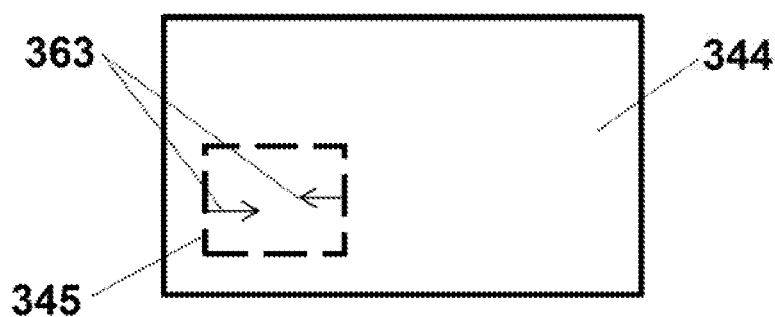

FIG. 39 Illustrates configuration example of a back illumination of a section of the surface (344) by the pix-cell (345) positioned behind (344). The configurations of the illumination of (344) include: number and type of pix-cells, and their location behind of the (344). The configuration parameters of each pix-cell (345) include: shape (rectangular shown as an example); location, number and type of LED's installed along the inner perimeter of the (345); mounting methods, including attachment methods of the (345) to the (344), or mounting the (344) and the pix-cells (345) from a common surface, such as a wall. For simplicity, the pix-cell (345) is shown configured as a rectangular shape.

Figure 40:
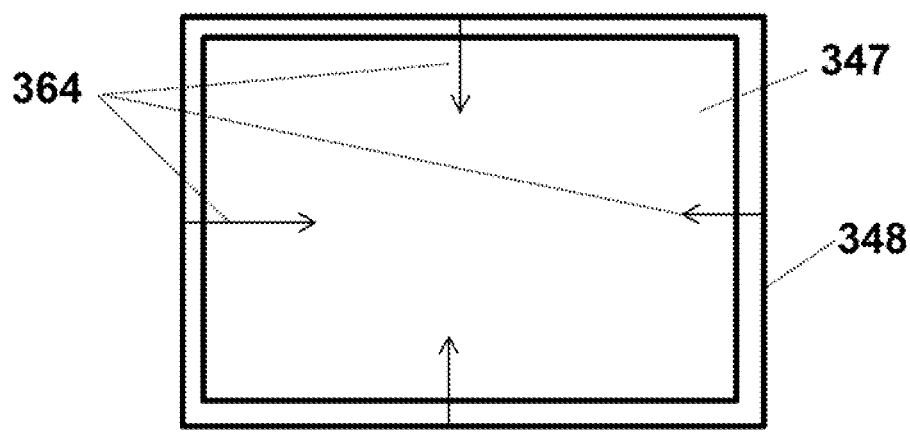

FIG. 40 Illustrates configuration example of an in-line illumination of the entire surface of (347), such as a surface with an art, by the pix-cell (348) configured to surround the (347). The (347) can be configured for other applications, including: electronic advertisement, billboard, video screen. The configuration parameters of the pix-cell (348) include: shape (rectangular shown as an example); location, number and type of LED's installed along the inner perimeter of the (348); mounting methods, including attachment methods of the (348) to the (347), or mounting the (347) and the pix-cells (348) from a common surface, such as a wall. For simplicity, both the surface (347) and the pix-cell (348) are shown configured as a rectangular shape.

Figure 41:
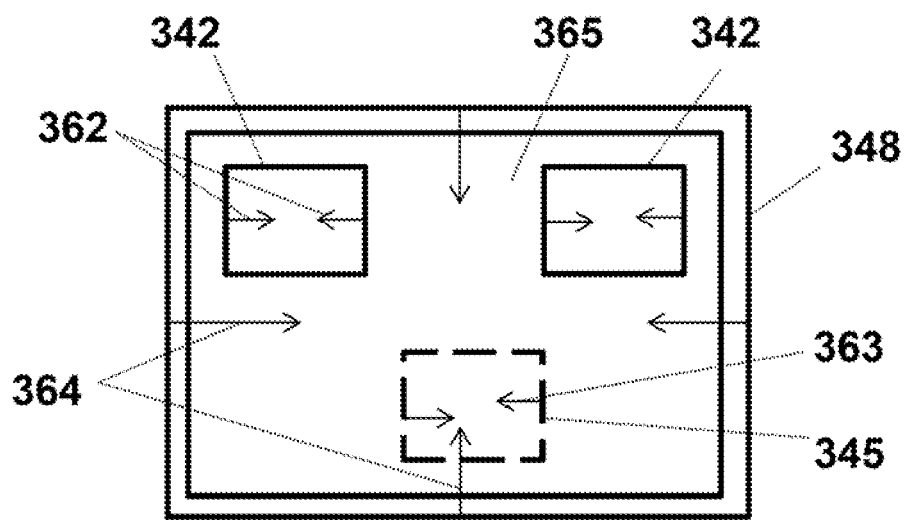

FIG. 41 Illustrates system configuration example of an illumination of the surface (365) combining: front illumination by the pix-cells (342); and back illumination by the pix-cell (345). The configurations of the illumination and configurations of each pix-cell include respective configurations described for FIGS. 38-40. A system controller (not shown for simplicity) will execute a control algorithm, and apply respective controls to the system, in order to sustain operation of the system within the acceptance criteria. Individual pix-cells, or a group of pix-cells, can be configured with an embedded controller. All controllers within the system can be configured with wired or wireless interfaces, supporting communication between controllers.

Figure 42:
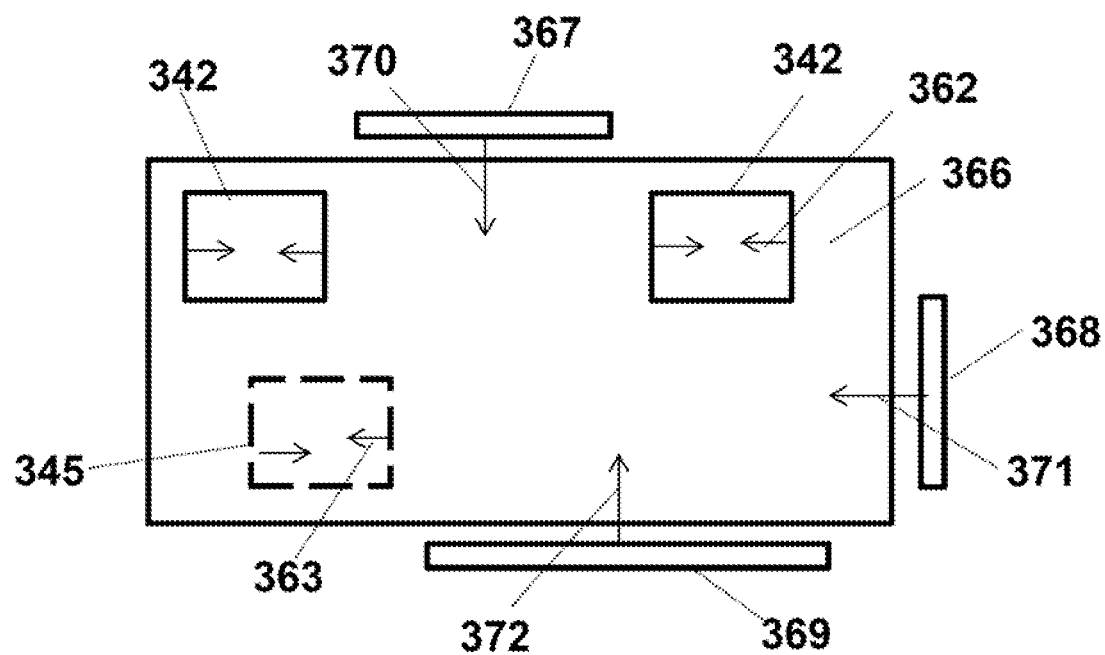

FIG. 42 Illustrates system configuration example of an illumination of the surface (366) combining: front illumination by the pix-cells (342); back illumination by the pix-cell (345); and side illumination by the pix-cells; (367) of the top section of the (366); (368) of the right section of the (366); and (369) of the bottom section of the (366). For simplicity, the center direction of illumination provided by the pix-cells is shown with an arrow, and selected directions are labeled as: (362), (363), (370), (371) and (372). The configurations of the illumination of (366) and configurations of each pix-cell include respective configurations described for FIGS. 38-41. Configurations of each pix-cell or group of pix-cells, and configurations of alignment and controls of the pix-cells include 3-D illumination effects. Configuration of each pix-cell can be unique. A system controller (not shown for simplicity) will execute a control algorithm, and apply respective controls to the system, in order to sustain operation of the system within the acceptance criteria. Individual pix-cells, or a group of pix-cells, can be configured with an embedded controller. All controllers within the system can be configured with wired or wireless interfaces, supporting communication between controllers. Example: pix-cells (342) can be grouped together and have an independent controller, which is interfaced to the system controller via wireless network. Remaining pix-cells (345), (367), (368) and (369), each can be configured with an independent controller, which is interfaced to the system controller via wireless network.

Figure 43:
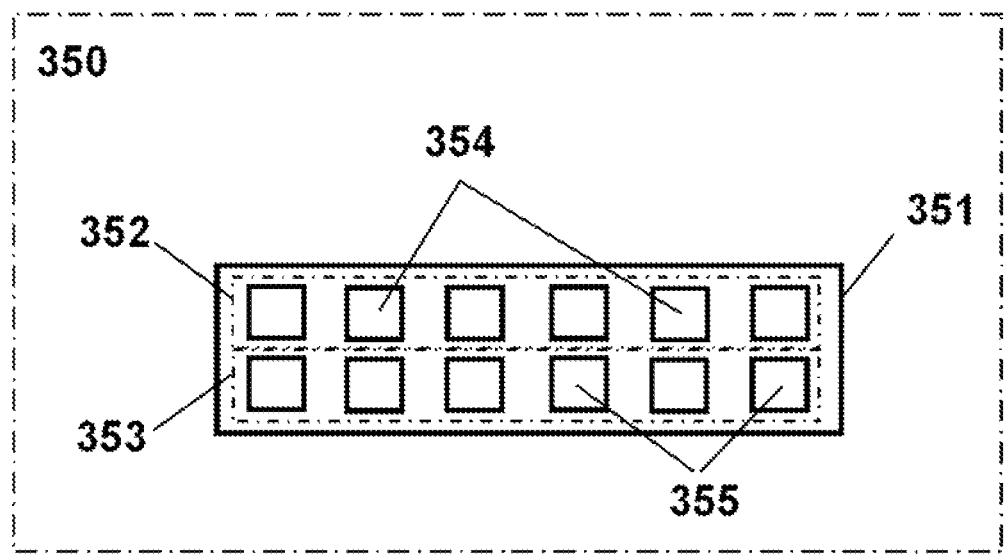

FIG. 43 Illustrates example configuration of a pix-cell (350) configured based on (351) PCB, which is configured with a dual row of LED's (352, 353). Each row configured respectively with LED's (354) and (355). The LED's (354, 355) are aligned side-by-side along the entire surface of (351). The configuration parameters of the pix-cell (350) include: type of the PCB (351), example: flexible PCB; size of the PCB; number of rows of LED's installed (two shown for simplicity); type of each LED installed. The control configurations of the pix-cell (350) include: individual control of each LED; common control applied to a group of LED's; common control of all LED's. The control configuration of each LED will depend on specifications parameters of the LED selected.

Figure 44:
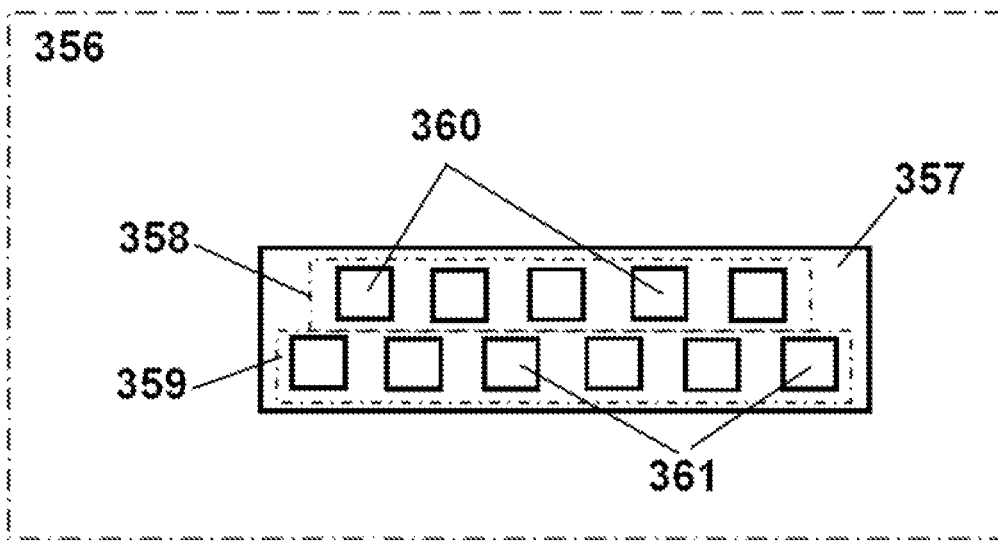

FIG. 44 Illustrates example configuration of a pix-cell (356) configured based on (357) PCB, which is configured with a dual row of LED's (358, 359). Each row configured respectively with LED's (360) and (361). The LED's (360, 361) respective alignment configurations include: horizontal offset between rows (as shown); individual offsets applied to each LED (not shown, for simplicity). The configuration parameters of the pix-cell (356) include: type of the PCB (357), example: flexible PCB; size of the PCB; number of rows of LED's installed (two shown for simplicity); type of each LED installed. The control configurations of the pix-cell (356) include: individual control of each LED; common control applied to a group of LED's; common control of all LED's. The control configuration of each LED will depend on specifications parameters of the LED selected.

The invention claimed is:

1. An intelligent modular configurable apparatus comprising:
   at least one configurable intelligent illumination pix-cell;
   at least one configurable solid-state light source;
   at least one configurable display;
   at least one configurable sensor;
   at least one configurable power source;
   at least one configurable controller;
   at least one configurable network;
   at least one configurable control algorithm;
   at least one configurable acceptance criteria;
   wherein the at least one intelligent illumination pix-cell is configured to include the at least one configurable solid-state light source; said pix-cell configured for providing illumination, including configuration for providing illumination for the at least one configurable display; a number of said pix-cells comprising a configurable display module;
   wherein the at least one solid-state light source is configured to provide illumination for the at least one illumination pix-cell; said light source configurations include configuration providing illumination in a direction which is substantially parallel to an observer standing in front of the illumination pix-cell; said light source configurations include configuration providing illumination in a direction which is substantially parallel to an observer standing in front of the at least one configurable display;
   wherein configurations of the at least one sensor include configuration for monitoring an environment, including the environment outside and within the apparatus; said environment including one or combination of: ambient light, temperature, power source, light produced by other devices, image produced by other devices;
   wherein configurations of the at least one sensor include configuration for reading an item identification; said identification including: barcode label, RFID;
   wherein configurations of the at least one sensor include configuration for sensing illumination properties produced by other devices; said devices including: illumination display, video image;
   wherein configurations of the at least one controller include configuration requiring the controller to be embedded into the at least one pix-cell;
   wherein configurations of the at least one controller include configuration requiring the controller to be embedded into the configurable display module;
   wherein the at least one controller is configured to connect with the at least one solid-state light source; said controller is further configured for monitoring and controlling operation of the light source;
   wherein the at least one controller is configured to connect with the at least one sensor; said controller is further configured for monitoring status of the sensor;
   wherein the at least one power source is configured to power the apparatus; said power source configurations include conventional DC power supply, battery, and solar battery;
   wherein the at least one controller is configured to execute at least one configurable control algorithm; said control algorithm includes configuration of the algorithm maintaining operation of the apparatus within the at least one acceptance criteria; said acceptance criteria include status and trigger level points for the sensors, which are used by the algorithm and the controller, and maintain operation of the apparatus within acceptance criteria; said acceptance criteria are configured to include specifications parameters of components comprising the apparatus; said control algorithm includes configuration supporting use of the components comprising the apparatus within the respective component specification requirements;
   wherein a number of apparatuses comprising a system; said system configured with a system controller; said system controller is configured to execute a system control algorithm; said system control algorithm includes interface between the system controller and the at least one module or pix-cell controller; said interface including the at least one configurable network; said system control algorithm includes configuration maintaining operation of the apparatus within the at least one acceptance criteria;
   wherein the at least one acceptance criteria includes configuration of the criteria for a device within the apparatus; said device includes the at least one intelligent illuminated module or pix-cell; said device control algorithm including configuration maintaining operation of the device within acceptance criteria;
   wherein a configurable system comprises of devices of the apparatus; said system configurations include the at least one controller, the at least one intelligent illuminated module or pix-cell, and the at least one network;
   wherein the at least one acceptance criteria includes configuration of a system acceptance criteria for the apparatus; said system acceptance criteria include configuration of the illumination parameters for the devices within the system; said system control algorithm including configuration maintaining operation of the apparatus within acceptance criteria.

2. The intelligent apparatus of claim 1 further comprising: the at least one intelligent illumination module or pix-cell providing illumination of the at least one configurable static display or a section of the static display; said configurations of the static display or the section of, include the static display containing images; said images include: art; said illumination, in respect to the display, include one or combination of: back-lighting, in-line lighting, in-front lighting; said combination includes configuration for 3D illumination.

3. The intelligent apparatus of claim 1 further comprising: the system of intelligent illumination modules or pix-cells providing illumination of the at least one configurable static display; said configurations of the static display include static display containing images; said images include: art; said illumination include one or combination of: back-lighting, in-line lighting, in-front lighting; said combination includes configuration for 3D display; said static display configurations include large scale electronic advertisements and billboards.

4. The intelligent apparatus of claim 1 further comprising: the at least one intelligent illumination module or pix-cell providing illumination of the at least one configurable display or a section of the display; said display include one or combination of: static display, dynamic display; said illumination include one or combination of: static illumination, dynamic illumination; said dynamic illumination include dynamic display containing real-time stream of video images; said images include real-time stream of video signals; said illumination include one or combination of: back-lighting, in-line lighting, in-front lighting; said combination includes configuration for 3D illumination.

5. The intelligent apparatus of claim 1 further comprising: the system of intelligent illumination modules or pix-cells providing dynamic illumination of the at least one configurable dynamic display; said dynamic illumination include dynamic display containing real-time stream of video images; said images include real-time stream of video signals; said illumination include one or combination of: back-lighting, in-line lighting, in-front lighting; said combination includes configuration for 3D video; said dynamic display configurations include large scale televisions and billboards.

6. The intelligent apparatus of claim 1 further comprising: the at least one intelligent system; said system configuration including controls of the system over the network; said controls including control of illumination modules or pix-cells of the system; said system control further comprising configuration including control of the displays illuminated by individual modules or pix-cells; said displays include one or combination of: static, dynamic, 2D, 3D; said control configurations include one or combination of: real-time independent control of each display; coordinated real-time control of selected displays.

7. A method of providing intelligent configurable illuminated displays; said method operating within configurable acceptance criteria; the configurations of said illuminated displays include configurations for displays of: static images, dynamic images, video dynamic images; the configurations of said acceptance criteria include criteria for: illumination parameters; quality specifications; reliability specifications; power consumption specifications; said acceptance criteria include configurations of the method for analyzing an existing display and reproducing the display within the said acceptance criteria on a larger scale, including super large scale displays: billboards, electronic advertisements, and televisions; and the method when compared to existing technologies of using discrete pixels for similar size of displays, the method providing benefits, including: savings in costs of the display; and improving reliability of the display; and the method including the at least one intelligent modular configurable apparatus; and the method consisting of;

programming the least one configurable intelligent illumination module or pix-cell; said programming including configuration and control algorithm; said configuration including acceptance criteria; said control algorithm including control of the module or pix-cell sustaining operation of the module or pix-cell within the acceptance criteria;

configuring the at least one intelligent illumination module or pix-cell for illuminating a configurable display; said display configuration including: static display, dynamic display; said illumination in compliance with the acceptance criteria;

configuring the at least one power source; said configurations including configuration of the power source providing power to the at least one intelligent illumination module during a power outage; said power source in compliance with the acceptance criteria;

configuring the at least one module or pix-cell controller for monitoring status of ambient environment; said controller monitoring status of the module or pix-cell, including self-diagnostics of electronics within the module or the pix-cell; said controller executing controls, including the controls of the at least one solid state illumination source of the module or the pix-cell; and the controller maintaining operation of the pix-cell within the acceptance criteria;

configuring the controller for performing configurable characterization process of the at least one pix-cell; said characterization process including configuration of the controller applying known controls to the pix-cell and the controller analyzing the illumination produced by the pix-cell; and result of the characterization is analyzed by the controller and stored in a non-volatile memory; and based on the results, the controller applying specific controls to the pix-cell, and the pix-cell generating the illumination according to characterization results;

configuring the controller for performing configurable characterization process of the at least one module; said characterization process including configuration of the controller applying known controls to the module and the controller analyzing the illumination produced by the module; and result of the characterization is analyzed by the controller and stored in a non-volatile memory; and based on the results, the controller applying specific controls to the module, and the module generating the illumination according to characterization results;

configuring the controller for obtaining information or specification data for a target illumination; said target illumination including: static and dynamic displays; said data including: illumination parameters; said data are obtained by the controller from one or combination of sources; said sources including: the controller reading the data stored in the non-volatile memory; the controller analyzing the target illumination produced by an independent device and recording the data in the non-volatile memory; the controller analyzing in real-time the target illumination produced by an independent device and recording the data in real-time in the non-volatile memory configuring the controller for performing static auto-tuning process of the at least one module or pix-cell; said static auto-tuning process including configuration of the controller applying controls to the module or pix-cell and the controller analyzing the illumination produced by the module or pix-cell; and the controller comparing the illumination produced by the module or pix-cell with a static target illumination; and the controller automatically adjusting the controls to bring the illumination generated by the module or pix-cell to within the acceptance criteria in respect to the static target illumination;

configuring the controller for performing dynamic auto-tuning process of the at least one module or pix-cell; said dynamic auto-tuning process including configuration of the controller applying in real-time controls to the module or pix-cell and the controller analyzing in real-time the illumination produced by the module or pix-cell; and the controller in real-time comparing the illumination produced by the module or pix-cell with a dynamic target illumination produced in real-time by another device; and the controller in real-time automatically adjusting the controls to bring the illumination generated by the module or pix-cell to within the acceptance criteria in respect to the dynamic target illumination;

configuring the at least one acceptance criteria to include one or combination of parameters in respect to: illumination, power, reliability; said illumination parameters including one or combination of: color, intensity, dynamic effects, image quality; said power parameters including one or combination of: limitations of applied power levels, limitations of consumed amount of energy, requirement for availability of stand-by power during a power outage;

configuring the control algorithm; said control algorithm sustaining operation of the system within the acceptance criteria; said control algorithm including configuration of an interface between the system controller and the at least one intelligent illumination module; said interface including wireless network for mobile devices, LAN and INTERNET.

8. The method of claim 7 of a controller applying a control algorithm to a pix-cell, and the controller characterizing the behavior of the pix-cell under the applied control algorithm; the characterization include the controller analyzing illumination parameters produced by the pix-cell; and the controller recording the controls and resulted illumination parameters produced by the pix-cell in a non-volatile memory; and the controller based on the at least one acceptance criteria, selecting specific controls and resulted illumination parameters, and formulating or identifying specification parameters for the pix-cell; the method further comprising: applying the pix-cells with known specifications parameters for constructing display modules; said display modules include modules of different shapes and sizes.

9. The method of claim 7 of a controller applying a control algorithm to a module, and the controller characterizing the behavior of the module under the applied control algorithm; the characterization include the controller analyzing illumination parameters produced by the module; and the controller recording the controls and resulted illumination parameters produced by the module in a non-volatile memory; and the controller based on the at least one acceptance criteria, selecting specific controls and resulted illumination parameters, and formulating or identifying specification parameters for the module; the method further comprising: applying the modules with known specifications parameters for constructing large scale illumination displays; said displays include: billboards, advertisements, movie screens.

10. The method of claim 7 of a process of producing a backlighting of a display to within the at least acceptance criteria; said process including a system producing backlighting for applications including: art, advertisements, billboards, video screens.

11. The method of claim 7 of a process of producing a front illumination of a display to within the at least acceptance criteria; said process including a system producing front illumination for applications including: art, advertisements, billboards, video screens.

12. The method of claim 7 of a process of producing an in-line illumination of a display to within the at least acceptance criteria; said process including a system producing in-line illumination for applications including: art, advertisements, billboards, video screens.

13. The method of claim 7 of a process of producing an illumination as a combination based on: front, in-line, and back illumination methods; said process applied to a display to within the at least acceptance criteria; said process including a system controlling each illumination method according to a control algorithm; said control algorithm producing illumination, including: 2D and 3D; said process producing illumination for applications including: art, advertisements, billboards, video screens.

14. The method of claim 7 of a process of producing a static display to within the at least acceptance criteria; said process including a system producing the static display on a larger scale for applications, including: billboards, advertisements.

15. The method of claim 7 of a process of producing a dynamic display to within the at least acceptance criteria; said process including a system producing in real-time the dynamic display on a larger scale display for applications, including: billboards, advertisements, movie screens.

16. The method of claim 7 of a process of reproducing a static display to within the at least acceptance criteria; said process including a system reproducing the static target display on a larger scale display for applications, including: billboards, advertisements.

17. The method of claim 7 of a process of reproducing a dynamic display to within the at least acceptance criteria; said process including a system reproducing in real-time the dynamic target display on a larger scale display for applications, including: billboards, advertisements, movie screens.

18. The method of claim 7 further comprising: wherein the acceptance criteria for the apparatus are configured to include a target requiring the apparatus compliance to local ordinances of a community the apparatus is installed.

19. The method of claim 7 further comprising: wherein the acceptance criteria for the apparatus are configured to include a target requiring the apparatus operating a real-time closed-loop control system, and the apparatus executing the control algorithm without operator assistance.

20. The method of claim 7 further comprising: wherein the communication between devices within the apparatus or the system, and communication between the apparatus or the system with devices or controllers outside the apparatus or the system, is configured to include: wireless network for mobile devices, LAN and INTERNET.

* * * * *